US008666390B2

(12) United States Patent
Meredith et al.

(10) Patent No.: US 8,666,390 B2
(45) Date of Patent: Mar. 4, 2014

(54) TICKETING MOBILE CALL FAILURES BASED ON GEOLOCATED EVENT DATA

(75) Inventors: Sheldon Meredith, Marietta, GA (US); Mark Austin, Roswell, GA (US); Brandon Hilliard, Woodstock, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 13/220,083

(22) Filed: Aug. 29, 2011

(65) Prior Publication Data
US 2013/0053023 A1 Feb. 28, 2013

(51) Int. Cl.
*H04W 24/00* (2009.01)
(52) U.S. Cl.
USPC ..... 455/423; 455/466; 455/456.1; 455/404.2; 455/422.1; 455/424
(58) Field of Classification Search
USPC ......... 455/466, 456.1, 404.2, 422.1, 423, 424
See application file for complete search history.

(56) References Cited

U.S. PATENT DOCUMENTS

| | | | |
|---|---|---|---|
| 5,724,660 | A | 3/1998 | Kauser et al. |
| 5,732,354 | A | 3/1998 | MacDonald |
| 5,732,383 | A | 3/1998 | Foladare et al. |
| 5,844,521 | A | 12/1998 | Stephens et al. |
| 5,982,324 | A | 11/1999 | Watters et al. |
| 6,018,312 | A | 1/2000 | Haworth et al. |
| 6,108,532 | A | 8/2000 | Matsuda et al. |
| 6,148,219 | A | 11/2000 | Engelbrecht et al. |
| 6,256,577 | B1 | 7/2001 | Graunke |
| 6,263,190 | B1 | 7/2001 | Mamori et al. |
| 6,298,233 | B1 * | 10/2001 | Souissi et al. ........... 455/423 |
| 6,311,078 | B1 | 10/2001 | Hardouin et al. |
| 6,317,686 | B1 | 11/2001 | Ran et al. |
| 6,353,778 | B1 | 3/2002 | Brown et al. |

(Continued)

FOREIGN PATENT DOCUMENTS

| | | |
|---|---|---|
| EP | 0856746 A2 | 8/1998 |
| JP | 2007328050 A | 12/2007 |
| WO | 2006031035 A1 | 3/2006 |

OTHER PUBLICATIONS

Fleishman. Using the Personal Hotspot on your AT & T iPhone. Published online Mar. 15, 2011. http://www.macworld.com/article/158556/2011/03/personal_hotspot_att . . . , 4 pages.

(Continued)

*Primary Examiner* — Nimesh Patel
*Assistant Examiner* — Thai Vu
(74) *Attorney, Agent, or Firm* — Turocy & Watson, LLP

(57) ABSTRACT

Providing for identifying and ticketing mobile network communication errors according to geographic position of the errors is described herein. By way of example, communication errors, such as dropped calls, can be tracked and recorded as a function of position of a mobile terminal affected by a dropped call. A number of these errors within a given location is compared with historic error data to determine statistically anomalous instances of communication errors. Upon identifying such an anomaly, an error ticket can be generated that identifies a geographic region associated with the error. Particularly, the geographic region can be independent of radio access network infrastructure, which is conventionally used as a means of locating events within a mobile network. A geographic error ticket can, in some aspects of the subject disclosure, facilitate discovery and troubleshooting of errors that originate at least in part from unknown or unanticipated sources.

19 Claims, 11 Drawing Sheets

(56) References Cited

U.S. PATENT DOCUMENTS

| | | | |
|---|---|---|---|
| 6,397,074 B1 | 5/2002 | Pihl et al. |
| 6,407,703 B1 | 6/2002 | Minter et al. |
| 6,429,815 B1 | 8/2002 | Soliman |
| 6,453,168 B1 | 9/2002 | McCrady et al. |
| 6,526,335 B1 | 2/2003 | Treyz et al. |
| 6,560,532 B2 | 5/2003 | Cayford |
| 6,594,576 B2 | 7/2003 | Fan et al. |
| 6,604,083 B1 | 8/2003 | Bailey et al. |
| 6,668,226 B2 | 12/2003 | Sutanto et al. |
| 6,690,292 B1 | 2/2004 | Meadows et al. |
| 6,744,383 B1 | 6/2004 | Alfred et al. |
| 6,744,740 B2 | 6/2004 | Chen |
| 6,801,782 B2 | 10/2004 | McCrady et al. |
| 6,801,855 B1 | 10/2004 | Walters et al. |
| 6,816,782 B1 | 11/2004 | Walters et al. |
| 6,933,100 B2 | 8/2005 | Igawa et al. |
| 6,933,860 B1 | 8/2005 | Gehman et al. |
| 7,065,349 B2 | 6/2006 | Nath et al. |
| 7,098,805 B2 | 8/2006 | Meadows et al. |
| 7,149,534 B2 | 12/2006 | Bloebaum et al. |
| 7,181,218 B2 | 2/2007 | Ovesjo et al. |
| 7,277,049 B2 | 10/2007 | Korneluk et al. |
| 7,289,039 B2 | 10/2007 | Kato et al. |
| 7,366,492 B1 | 4/2008 | Ganesh |
| 7,375,649 B2 | 5/2008 | Gueziec |
| 7,432,829 B2 | 10/2008 | Poltorak |
| 7,508,321 B2 | 3/2009 | Gueziec |
| 7,697,917 B2 | 4/2010 | Camp et al. |
| 7,706,964 B2 | 4/2010 | Horvitz et al. |
| 7,744,740 B2 | 6/2010 | Diehl |
| 7,761,225 B2 | 7/2010 | Vaughn |
| 7,831,380 B2 | 11/2010 | Chapman et al. |
| 7,848,880 B2 | 12/2010 | Cheung |
| 7,945,271 B1 | 5/2011 | Barnes et al. |
| 7,962,162 B2 | 6/2011 | McNair |
| 7,962,280 B2 | 6/2011 | Kindo et al. |
| 7,994,981 B1 | 8/2011 | Farrokhi et al. |
| 8,036,822 B2 | 10/2011 | Ho et al. |
| 8,194,589 B2 | 6/2012 | Wynn et al. |
| 8,195,175 B2 | 6/2012 | Govindan et al. |
| 8,254,959 B2 | 8/2012 | Fix et al. |
| 8,270,933 B2 | 9/2012 | Riemer et al. |
| 8,280,438 B2 | 10/2012 | Barbera et al. |
| 8,295,854 B2 | 10/2012 | Osann et al. |
| 8,355,865 B2 | 1/2013 | Wagner et al. |
| 2001/0047242 A1 | 11/2001 | Ohta |
| 2002/0059266 A1 | 5/2002 | I'anson et al. |
| 2002/0077116 A1 | 6/2002 | Havinis et al. |
| 2003/0097330 A1 | 5/2003 | Hillmer et al. |
| 2003/0115260 A1 | 6/2003 | Edge |
| 2003/0222819 A1 | 12/2003 | Karr et al. |
| 2004/0127191 A1* | 7/2004 | Matsunaga ............ 455/403 |
| 2004/0131036 A1 | 7/2004 | Walsh |
| 2004/0155814 A1 | 8/2004 | Bascobert |
| 2004/0224698 A1 | 11/2004 | Yi et al. |
| 2005/0039056 A1 | 2/2005 | Bagga et al. |
| 2005/0053099 A1 | 3/2005 | Spear et al. |
| 2005/0136911 A1* | 6/2005 | Csapo et al. ............ 455/423 |
| 2005/0272445 A1 | 12/2005 | Zellner et al. |
| 2006/0046744 A1 | 3/2006 | Dublish et al. |
| 2006/0075131 A1 | 4/2006 | Douglas et al. |
| 2006/0089153 A1 | 4/2006 | Sheynblat |
| 2006/0282660 A1 | 12/2006 | Varghese et al. |
| 2007/0001873 A1 | 1/2007 | Ishikawa et al. |
| 2007/0060130 A1 | 3/2007 | Gogic et al. |
| 2007/0217375 A1 | 9/2007 | Zampiello et al. |
| 2007/0217379 A1 | 9/2007 | Fujiwara et al. |
| 2007/0293157 A1 | 12/2007 | Haartsen et al. |
| 2008/0004789 A1 | 1/2008 | Horvitz et al. |
| 2008/0071466 A1 | 3/2008 | Downs et al. |
| 2008/0076450 A1 | 3/2008 | Nanda et al. |
| 2008/0096566 A1 | 4/2008 | Brunner et al. |
| 2008/0133730 A1 | 6/2008 | Park et al. |
| 2008/0186234 A1 | 8/2008 | Alles et al. |
| 2008/0274750 A1 | 11/2008 | Carlson et al. |
| 2008/0311923 A1 | 12/2008 | Petrovic et al. |
| 2009/0024546 A1 | 1/2009 | Ficcaglia et al. |
| 2009/0052330 A1* | 2/2009 | Matsunaga et al. ........... 455/423 |
| 2009/0079622 A1 | 3/2009 | Seshadri et al. |
| 2009/0104917 A1 | 4/2009 | Ben Rached et al. |
| 2009/0117907 A1 | 5/2009 | Wigren et al. |
| 2009/0181695 A1 | 7/2009 | Wirola et al. |
| 2009/0280828 A1 | 11/2009 | Wang et al. |
| 2009/0287922 A1 | 11/2009 | Herwono et al. |
| 2009/0310501 A1* | 12/2009 | Catovic et al. ............... 370/252 |
| 2009/0327134 A1 | 12/2009 | Carlson et al. |
| 2010/0058442 A1* | 3/2010 | Costa et al. ..................... 726/3 |
| 2010/0100732 A1 | 4/2010 | Hatakeyama et al. |
| 2010/0159951 A1 | 6/2010 | Shkedi et al. |
| 2010/0189236 A1 | 7/2010 | MacDonald et al. |
| 2010/0190509 A1 | 7/2010 | Davis et al. |
| 2010/0203903 A1 | 8/2010 | Dingler et al. |
| 2010/0207470 A1 | 8/2010 | Kim et al. |
| 2010/0220665 A1 | 9/2010 | Govindan et al. |
| 2010/0250542 A1 | 9/2010 | Fujimaki |
| 2010/0299060 A1 | 11/2010 | Snavely et al. |
| 2011/0010085 A1 | 1/2011 | Tanaka et al. |
| 2011/0060808 A1 | 3/2011 | Martin et al. |
| 2011/0076975 A1 | 3/2011 | Kim et al. |
| 2011/0077032 A1 | 3/2011 | Correale et al. |
| 2011/0161261 A1 | 6/2011 | Wu et al. |
| 2011/0164596 A1 | 7/2011 | Montemurro et al. |
| 2011/0172905 A1 | 7/2011 | Schroder et al. |
| 2011/0207470 A1 | 8/2011 | Meredith et al. |
| 2011/0244879 A1 | 10/2011 | Siomina et al. |
| 2011/0271331 A1 | 11/2011 | Adams |
| 2012/0028650 A1 | 2/2012 | Cooper et al. |
| 2012/0030083 A1 | 2/2012 | Newman et al. |
| 2012/0062415 A1 | 3/2012 | Hwang et al. |
| 2012/0139782 A1 | 6/2012 | Gutt et al. |
| 2012/0158289 A1 | 6/2012 | Bernheim Brush et al. |
| 2012/0323703 A1 | 12/2012 | Hillier et al. |
| 2013/0007058 A1 | 1/2013 | Meredith et al. |
| 2013/0023237 A1 | 1/2013 | Meredith et al. |
| 2013/0023274 A1 | 1/2013 | Meredith et al. |
| 2013/0023281 A1 | 1/2013 | Meredith et al. |

OTHER PUBLICATIONS

Fleischfresser. Never Stop at a Red-Light Again. Published online Aug. 30, 2011. http://www.smartplanet.com/blog/..., 2 pages.

Cellphone Networks and the Future of Traffic. Published online Mar. 2, 2011. http://m.wired.com/autopia/2011/03/cell-phone-networks-and-the-future-... 15 pages.

Intelligent Transportation System. Published online http://en.wikipedia.org/wiki/Intelligent_transportation_system, 7 pages.

Bitcarrier Technology. Published online at http://www.bitcarrier.com/technology. 1 page.

Hao Peng, Ban Xuegang(Jeff). Estimating Vehicle Position in a Queue at Signalized Intersections Using Simple Travel Times from Mobile Sensors. 6 pages.

Ban Xuegang(Jeff), Gruteser Marco. Mobile Sensor as Traffic Probes: Addressing Transportation Modeling and Privacy Protection in an Integrated Framework. Dated Jan. 10, 2010. 17 pages.

Koukoumidis Emmanouil, Peh Li-Shiuan, Martonosi Margaret, SignalGuru: Leveraging Mobile Phones for Collaborative Traffic Signal Schedule Advisory. 14 pages.

Office Action dated Dec. 15, 2011 for U.S. Appl. No. 12/712,424, 34 pages.

Office Action dated Dec. 28, 2011 for U.S. Appl. No. 12/836,471, 34 pages.

Office Action dated Feb. 23, 2012 for U.S. Appl. No. 12/967,747, 31 pages.

OA dated Apr. 13, 2012 for U.S. Appl. No. 12/416,853, 36 pages.

International Search Report for PCT Application No. US2011/026122 dated Sep. 10, 2011, 11 pages.

International Search Report for PCT Application No. US2011/026120 dated Sep. 9, 2011 13 pages.

Charitanetra et al. "Mobile positioning location using E-OTD method for GSM network" Research and Development, 2003. Proceedings Student Conference on Putrajaya, Malaysia Aug. 25-26, 2003, pp. 319-324.

(56) References Cited

OTHER PUBLICATIONS

"Location Labs Powers Location-based Fraud Detection", All Points Blog, http://webcache.googleusercontent.com/search?hl=en&rlz=1R2GFRE_en US398&q=cache:trsMn9Sin6wJ:http://apb.directionsmag.com/entry/location-labs-powers-location-based-fraud-detection/162802+http%3A//apb.directionsmag.com/entry/location-labs-powers-location-based-...1&ct=clnk, Oct. 12, 2010.

"Location Based Fraud Detection", Finsphere Corporation, 2008-2010.

Cortes, et al. "Support-Vector Networks", Machine Learning, 20, 1995. http://www.springerlink.com/content/k238jx04hm87j80g/fulltext.pdf. Last accessed Dec. 24, 2010, 25 pages.

ACM Website, Press release of Mar. 17, 2009. http://www.acm.org/press-room/news-releases/pdfs/awards-08-groupa1.pdf. Last accessed Dec. 24, 2010, 3 pages.

Boser, et al. A training algorithm for optimal margin classifiers. In D. Haussler, editor, 5th Annual ACM Workshop on COLT, pp. 144-152, Pittsburgh, PA, 1992. ACM Press. http://citeseerx.ist.psu.edu/viewdoc/summary?doi=10.1.1.21.3818. Last accessed Dec. 24, 2010, 9 pages.

Hsu, et al. A Practical Guide to Support Vector Classification. Department of Computer Science National Taiwan University, Last updated: Apr. 15, 2010. http://www.csie.ntu.edu.tw/~cjlin/papers/guide/guide.pdf. Last accessed Dec. 24, 2010, 16 pages.

Drucker, et al. Support Vector Regression Machines. http://scholar.google.com/scholar?q=%22Support+Vector+Regression+Machines.%22. Last accessed Dec. 24, 2010, 7 pages.

New Devices Aim to Disable Cell Phones While Driving. FOXNews.com, Jan. 18, 2009. http://www.foxnews.com/printer_friendly_story/0,3566,480585,00.html. Last accessed Nov. 24, 2010, 2 pages.

3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.

3rd Generation Partnership Project, Technical Specification, "Group Radio Access Network, UTRAN Iuh interface Node B Application Part (NBAP) signalling (Release 8)", 3GPP TS 25.469 V8.0.0 (Dec. 2008), last viewed Jul. 1, 2009, 56 pages.

Sullivan, Mark. "Signs and Wonders: Is AT&T Stepping Up Its Game?" PC World, Dec. 10, 2009, 1 page.

ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.

ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.

Suykens et al., "Least squares support vector machine classifiers", Neural Processing Letters, vol. 9, No. 3, Jun. 1999, pp. 293-300.

Ferris et al. (2002). "Interior-point methods for massive support vector machines". SIAM Journal on Optimization 13: 783-804. doi:10.1137/S1052623400374379.

Meyer et al. "The support vector machine under test." Neurocomputing 55(1-2): 169-186, 2003.

OA dated Oct. 15, 2012 for U.S. Appl. No. 13/523,778, 21 pages.
OA dated Dec. 20, 2012 for U.S. Appl. No. 12/958,146, 23 pages.
OA dated Dec. 28, 2012 for U.S. Appl. No. 13/188,295, 37 pages.
OA dated Jan. 3, 2013 for U.S. Appl. No. 13/188,300, 36 pages.
OA dated Nov. 8, 2012 for U.S. Appl. No. 13/204,535, 30 pages.
OA dated Oct. 2, 2012 for U.S. Appl. No. 13/554,285, 19 pages.
OA dated Aug. 30, 2012 for U.S. Appl. No. 12/958,146, 40 pages.
MobileLutions Introduces MobiLoc—A Breakthrough Technology to Control Texting in the Mobile Workplace. Press release Oct. 10, 2010 by MobileLutions. 2 pages.

DriveAssist Frequently Ask question by Aegis Mobility, Wayback archive Jul. 12, 2010, 2 pages.
OA dated Jul. 30, 2012 for U.S. Appl. No. 12/967,747, 28 pages.
OA dated Sep. 11, 2012 for U.S. Appl. No. 13/188,345, 44 pages.
Final Office Action dated Jan. 25, 2013, for U.S. Appl. No. 13/554,285, 20 pages.
Non-Final Office Action dated Mar. 19, 2013, for U.S. Appl. No. 13/174,541, 46 pages.
Non-Final Office Action dated Mar. 19, 2013, for U.S. Appl. No. 13/284,497, 46 pages.
Final Office Action dated Feb. 22, 2013, for U.S. Appl. No. 13/188,345, 45 pages.
Final Office Action dated Mar. 15, 2013, for U.S. Appl. No. 13/204,535, 18 pages.
Non-Final Office Action dated Apr. 19, 2013, for U.S. Appl. No. 13/277,595, 58 pages.
Notice of Allowance mailed Aug. 12, 2013, for U.S. Appl. No. 13/174,541, 40 pages.
Final Office Action dated Aug. 2, 2013, for U.S. Appl. No. 13/188,295, 26 pages.
Final Office Action dated Aug. 2, 2013, for U.S. Appl. No. 13/188,300, 38 pages.
Non-Final Office Action dated Jun. 20, 2013, for U.S. Appl. No. 13/219,911, 61 pages.
Non-Final Office Action dated Jul. 17, 2013, for U.S. Appl. No. 13/188,345, 27 pages.
Non-Final Office Action dated Jun. 20, 2013, for U.S. Appl. No. 13/291,917, 52 pages.
Non-Final Office Action dated May 31, 2013, for U.S. Appl. No. 13/523,770, 40 pages.
Non-Final Office Action dated Dec. 11, 2013, for U.S. Appl. No. 13/188,295, 52 pages.
Non-Final Office Action dated Dec. 24, 2013, for U.S. Appl. No. 13/188,300, 44 pages.
Final Office Action dated Dec. 11, 2013, for U.S. Appl. No. 13/291,917, 34 pages.
Non-Final Office Action dated Sep. 19, 2013, for U.S. Appl. No. 13/927,020, 30 pages.
Non-Final Office Action dated Oct. 2, 2013 for U.S. Appl. No. 12/958,146, 31 pages.
Non-Final Office Action dated Sep. 26, 2013 for U.S. Appl. No. 13/284,456, 58 pages.
RouteFinder 3.00 for ArGIS Documentation, ©2007 Routeware and Higher Mapping Solutions, 71 pages, downloaded from http://www.routeware.dk/download/routefinder_arcgis.pdf.
mySociety (Web page), "More travel-time maps and their uses", 2007, downloaded from http://www.mySociety.org/2007/more-travel-maps/, 10 pages total (including a single page Examiner's attachment showing the operation of the interactive travel-time map). Wayback machine archive from Jan. 21, 2009 of the mySociety Web page, "More travel-time maps and their uses", downloaded from http://web.archive.org/web/20090121193615/http://www.mysociety.org/2007/more-travel-maps/, 11 pages.
Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.
Non-Final Office Action dated Nov. 5, 2013 for U.S. Appl. No. 13/188,136, 47 pages.
Final Office Action dated Sep. 18, 2013 for U.S. Appl. No. 13/284,497, 30 pages.
Final Office Action dated Aug. 22, 2013 for U.S. Appl. No. 13/277,595, 36 pages.
Final Office Action dated Oct. 21, 2013 for U.S. Appl. No. 13/523,770, 24 pages.
Office Action dated Nov. 5, 2013 for U.S. Appl. No. 13/188,345, 30 pages.

* cited by examiner

TICKETING MOBILE CALL FAILURES BASED ON GEOLOCATED EVENT DATA

REFERENCE TO RELATED APPLICATIONS

The subject application for patent is related to co-pending U.S. application Ser. No. 12/712,424 entitled "TIMED FINGERPRINT LOCATION IN WIRELESS NETWORKS" and filed Feb. 25, 2010, and to co-pending U.S. application Ser. No. 13/219,911 entitled "PRIORITIZING NETWORK FAILURE TICKETS USING MOBILE LOCATION DATA" and filed Aug. 29, 2011, both of which are assigned to the assignee hereof and hereby expressly incorporated by reference herein.

TECHNICAL FIELD

The subject disclosure relates to wireless communications and, more particularly, to acquiring radio interface failure statistics for a mobile network as a function of terminal position, and ticketing mobile call failures in response to a geolocated communication error event.

BACKGROUND

Mobile equipment networks provide real-time wireless communication services to subscriber communication terminals, through a planned deployment of radio access base stations. Base stations are carefully positioned throughout the deployment to provide seamless wireless coverage for a geographic area served by a mobile equipment network. Because gaps in base station coverage result in communication dead spots, or areas without wireless service, network operators tend to carefully test base station deployments to identify and correct gaps in wireless coverage.

Because base station deployments are carefully planned to provide seamless wireless coverage, respective geographic locations of individual base stations are generally well known by service providers. Some providers store base station location data in a network server, and leverage this data to provide communication services. For instance, knowledge of base station position can be useful in assisting subscriber terminal position applications including, for example, real-time mapping software, or the like. By analyzing timing of signals transmitted to and received from a subscriber terminal, a base station can form an estimate of distance to the terminal. Multiple base stations performing similar computations can yield a position of the terminal, generally within several hundred meters accuracy. The degree of accuracy for such techniques, referred to as trilateration or multilateration more generally, can depend in part on spacing between nearby base stations, as well as various time-varying signal characteristics. In addition to the foregoing, maintenance personnel may also reference a network server that stores base station location data for identifying and locating base stations experiencing technical problems.

Mobile network systems are typically configured to identify occurrences of dropped calls, also referred to as radio interface failures. A dropped call is a circumstance where a wireless call in progress is unexpectedly terminated. Generally, the dropped call is a result of a technical problem in maintaining a radio communication interface between a subscriber terminal and a radio access network (RAN), the network of base stations acting as a radio access interface to a communication network. These technical problems can vary, but can include entering a dead zone (where base station signals cannot be received by the subscriber terminal) or otherwise moving out of range of the RAN, interference or jamming by other radio frequency transmitters, failed handoff between one base station and another, nearby base stations reaching or exceeding terminal load capacity, hardware transmission or reception problems, and so on. In rare instances, solar events such as sun spots and solar flares can affect electromagnetic fields on the Earth, leading to localized instances of dropped calls (albeit sometimes in large localities). Generally speaking, frequency of dropped calls is a common subscriber complaint for wireless service providers. Accordingly, research and development within the wireless communications industry continues to search for cost effective ways to improve wireless coverage, limit interference, improve handoff and other mobility services, and generally reduce instances of dropped calls.

Mobile network systems have some capacity to identify and track network-based communication errors. For instance, if a particular base site goes offline, network maintenance equipment can detect such an event and issue an error ticket to maintenance personnel. The maintenance personnel can use the ticket to identify the base station and its location to deploy repair resources. Networks can often identify particular base stations experiencing a high dropped call rate, as well. However, a high dropped call rate itself does not determine exactly where the calls are dropping (with geographic resolution any better than the location of a network cell, which can be quite large) or why. Accordingly, repair tickets are issued against a base station site generally, with little additional information to locate or identify a cause of the underlying problem. Given tight resource constraints it can be impractical to expect service personnel to do extensive drive testing to locate and diagnose the problem. Thus, problems often go unresolved. Worse still, in certain mobile networks call processing occurs with soft handoff in which several base stations maintain communications with individual subscriber units concurrently. If a particular base station experiences a high dropped call rate, at least some of the other base stations may participate in the problem, expanding the potential range of the problem and further clouding its source.

SUMMARY

The following presents a simplified summary to provide a basic understanding of some aspects of the various embodiments. This summary is not an extensive overview of the various embodiments. It is intended to neither identify key or critical elements of the various embodiments nor delineate the scope of such embodiments. Its sole purpose is to present some concepts of the various embodiments in a simplified form as a prelude to the more detailed description that is presented later.

Various aspects of the disclosed subject matter provide for identifying and ticketing mobile network communication errors according to geographic position of the errors. Communication errors, such as radio interface failures (RIFs) or dropped calls, can be tracked and recorded as a function of mobile terminal position affected by respective errors. A number of these errors within a given location is compared with historic error data to determine statistically anomalous instances of communication errors. Upon identifying such an anomaly, in at least one aspect of the subject disclosure an error ticket is generated that identifies a geographic region associated with the error. Particularly, the geographic region can be independent of radio access network (RAN) infrastructure which is conventionally used as a means of locating events within a mobile network.

According to one or more further aspects, a geographic region served by a mobile network can be characterized statistically by a grid of discrete and contiguous two-dimensional shapes, or bins, representing respective contiguous subsets of the geographic region. Instances of dropped calls can be recorded periodically and associated with a bin in which a mobile terminal affected by a dropped call is located. Once collected, contemporaneous call drop data within a given bin can be compared with historic norms for that bin over similar periods (e.g., similar time of day, day of the week, season of the year, and so on). Where a statistical anomaly in call drops is detected, a geographic repair ticket can be issued as described above. In at least one aspect of the subject disclosure, issuing the geographic repair ticket can be conditioned on whether a base station repair ticket exists near the geographic region. If a base station problem has been identified, it can be assumed that the base station problem is the source of the statistical anomaly in dropped calls, and the geographic location ticket is not issued.

According to further aspects, the grid of bins characterizing the geographic coverage area can comprise bins having different areas. Particularly, bin area can be dependent on spacing between base station equipment in a given region of the mobile network, thereby providing improved geographic resolution over what the base station deployment already provides. Thus, where network sectors are 300 to 500 meters apart for instance, bin spacing might be made about 100 square meters in area or less, providing sub-sector location information for those network sectors. Where network sectors are multiple kilometers apart, bin spacing might be 300-400 square meters in area or more. In at least one aspect, bin size can also be a function at least in part of terminal population density within a region of the mobile network.

In still other aspects of the subject disclosure, clusters of bins can be established for purposes of collecting statistically significant call drop information per bin. Bins with a small terminal population density might have very few call drops because few calls are being made, quite apart from any communication problem in a given geographic area. For regions with low call density, call drop instances within a cluster of bins around a given bin can be collected and associated with the given bin. This can be done for other bins in those regions, providing a more statistically significant number of dropped calls with which to perform a call drop analysis. In dense urban areas having high call volume, a cluster might be no larger than the given bin (e.g., the cluster is just one bin), whereas in rural areas a suitable cluster size might be an aggregate of many bins. According to a particular aspect, terminal population density information (as well as base station spacing) can be periodically reviewed to update bin size and cluster size for various regions of the mobile network.

In one or more other aspects of the subject disclosure, terminal location for geographically positioning a dropped call can be determined for a mixed population of location aware and non-location aware terminals. For location aware terminals, the terminal can provide its location to the network, either on its own initiative or upon request by the network. Accurate position of one or more location aware terminals can be utilized to acquire signal timing and delay information within a sector of a network. This timing and delay information can be used to estimate position of non-location aware terminals, or location aware terminals that do not report their position, with respect to the grid of bins. Thus, when a call drop occurs, a terminal can be located within a given bin and the call drop then associated with that bin.

In still other aspects, geographic error tickets disclosed herein can be given a repair priority commensurate with impact to subscriber services of respective errors. In one example, the repair priority can simply be quantified proportionate to the number of call drops in a geographic area. In another example, the repair priority can be quantified based on statistical deviation from historic norms. In at least one further aspect, the repair priority can be quantified in part based on estimated impact to surrounding network infrastructure resulting from the error.

The following description and the annexed drawings set forth in detail certain illustrative aspects of the disclosed subject matter. These aspects are indicative, however, of but a few of the various ways in which the principles of the disclosed subject matter may be employed and the subject matter disclosed herein is intended to include all such aspects and their equivalents. Other advantages and distinguishing features of the disclosed subject matter will become apparent from the following detailed description of various disclosed embodiments when considered in conjunction with the drawings.

DETAILED DESCRIPTION

Figure 1:
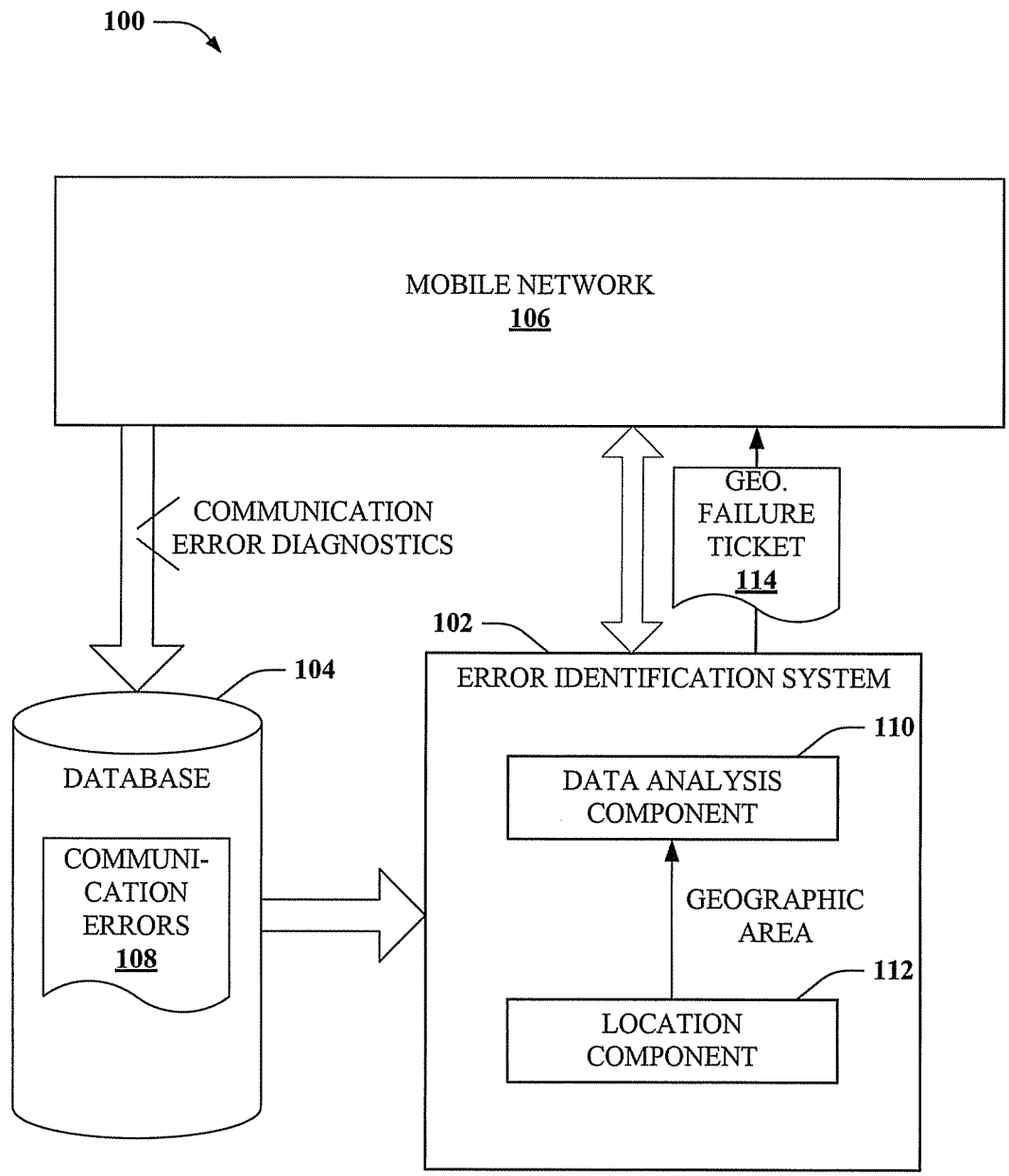
FIG. 1 illustrates a block diagram of an example system that identifies and tickets network communication errors as a function of geographic area.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter can be practiced without these specific details. In other instances, well-known structures and devices are shown in block diagram form to facilitate describing the disclosed subject matter.

Where used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. Also, these components can execute from various computer readable media having various data structures stored thereon. The components may communicate via local or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth.

Referring now to the drawings, FIG. 1 illustrates a block diagram of an example system 100 that provides geolocated failure ticketing for identified communication errors in a mobile network according to various aspects of the subject disclosure. System 100 can be employed as part of a mobile network to provide automated maintenance functions for the mobile network. Particularly, system 100 can be configured to monitor radio interface failure (RIF) events (e.g., dropped calls) for at least a subset of the mobile network, and identify potential communication problems from an analysis of RIF events. In one or more aspects of the subject disclosure, a repair ticket can be generated identifying a geographic region in which a potential communication problem is identified. In a particular aspect, generating the repair ticket can be conditioned on determining that a base station error is not causing the problem, as discussed in more detail below (e.g., see FIGS. 2 and 6, infra). Once generated, the repair ticket can be distributed to repair personnel for further handling.

As depicted, system 100 can comprise an error identification system 102, communicatively connected with a database 104. Error identification system 102 can be configured to compare contemporaneous instances of RIFs with historic data as a mechanism for identifying a potential communication problem for a mobile network 106. Database 104 can be configured to acquire, parse and store the historic information, as described in more detail herein.

RIF events can result from numerous conditions. In some cases, an RIF or group of RIFs can result from entirely predictable (and mundane) circumstances, such as traveling outside a range of a mobile network's radio access network (RAN) infrastructure. Probably the most common example of this problem is entering what is referred to as a dead zone, where the RAN does not provide wireless coverage. A less frequent but similar example might occur when crossing from one country into another country, for instance, particularly where mobile network service providers serving the respective countries do not have a cooperative service agreement. Another common reason for RIF events is base station equipment failure. If a base station experiences hardware or software problems, it may be unable to serve some or all subscribers within a sector or cell served by the base station. Co-channel and adjacent channel interference can be yet another reason for RIF events. Neighboring cells transmitting on the same frequency can interfere with each other, deteriorating wireless service. These are generally static problems, at least until corrected in the case of base station failures and interference among cells. Transient problems unrelated to a wireless network or its infrastructure can be particularly difficult to identify and troubleshoot.

In some cases, electronic equipment can produce spurious noise that interferences significantly with mobile network communications, potentially causing RIF events. A power substation with a bad coil can transmit electromagnetic radiation within the radio frequencies, potentially disrupting cellular and other wireless communication. Arc welding equipment, if not tuned properly, can transmit broadband noise. A neighboring mobile serving provider can mis-program a transmit frequency band for a portion of its RAN, causing interference to service provider's mobile network 106. Oscillating bidirectional amplifiers and repeaters can also be a source of spurious noise, as well as various other conditions. Because these types of problems are generally not caused by components of mobile network 106 or an associated RAN, they can be difficult to identify.

Conventional mechanisms for addressing RIF events typically rely on identifying an error with a base station. When such an error cannot be found, the problem often goes uncorrected. This is because conventional techniques to locate problems within a network independent of the network infrastructure either do not exist or are largely inadequate. Thus, a problem that is not directly tied with a particular base station or other entity having well known location (either geographically, such as a base station, or virtually, such as a component of a network) can be difficult to identify and diagnose with conventional network troubleshooting.

According to particular aspects of the subject disclosure, system 100 can be configured to identify and locate communication errors (e.g., RIFs) within service provider's mobile network independent of position of network infrastructure equipment (e.g., radio tower position, base station position, etc.). Particularly, database 104 can receive communication error diagnostics from a component of service provider's mobile network that include location data of a mobile terminal affected by a communication error. (See, for example, co-pending U.S. patent application Ser. No. 12/712,424). As an example, respective instances of RIF events can be accompanied by respective position data of mobile terminals associated with the respective RIFs. As is described in more detail herein, the position data can be utilized to map instances of RIF events throughout a geographic area served by mobile network 106. Further, database 104 can re-acquire communication error diagnostics over time (e.g., periodically, in response to a predetermined event(s), or the like, or a suitable combination thereof), enabling database 104 to generate a rich dataset of historic instances of RIF events as a function of time period (e.g., time of day, day of the week, season of the year, and so on) and of position throughout the geographic area served by service provider's mobile network.

Communication error data is stored by database 104 in communication error storage 108. Communication error storage 108 can parse the communication error data at least as a function of time period, time interval, or position within a geographic area served by mobile network 106. Suitable time periods can include a period over which data is re-acquired for the network and updated to database 104 (e.g., hourly, every ten minutes, twice daily, daily, weekly, or the like, or suitable combinations thereof), although it should be appreciated that communication error storage 108 can parse communication error data as a function of time independent of frequency of data collection, in some aspects. Further, communication error data can be compiled and aggregated over suitable time periods by communication error storage 108, including daily, weekly, monthly, bi-monthly, yearly, or the like.

According to one or more additional aspects of the subject disclosure, database 104 can compile and parse instances of communication error as a function of geographic position of respective subscriber terminals affected by the instances of communication error. Geographic position can be determined for a population of location aware and non-location aware terminals served by mobile network 106. As is described in more detail in U.S. patent application Ser. No. 12/712,424, signal timing and delay information can be acquired for various sectors of mobile network 106 from location aware terminals served by, or near to, those sectors. This signal timing and delay information can then be leveraged to determine relatively accurate position data (e.g., within about 70 meters or less) for non-location aware terminals. It should be appreciated that aspects of the disclosed subject matter are not limited to the foregoing mobile terminal position determinations, however, and other suitable mechanisms for determining mobile terminal geographic position known in the art or made known to one of skill in the art by way of the context provided herein are considered within the scope of the subject disclosure.

To locate instances of communication error within a geographic area served by mobile network 106, database 104 can be configured to characterize the geographic area as a grid of discrete and contiguous two-dimensional shapes (grid bins), or three-dimensional shapes for three-dimensional position determinations (e.g., utilizing GPS or AGPS, satellite position location mechanisms, or the like). See, for example, FIGS. 3 and 4, infra. When a communication error instance occurs, mobile network 106 records a location of an associated mobile terminal. This can be performed for each communication error instance. Periodically, all communication error instances and related location information compiled within a given time period—referred to herein as contemporaneous instances of communication error—are provided to database 104. Database 104 identifies a grid bin in which the location is positioned (or mostly positioned, for a location comprising an area or range of areas) and associates the occurrence with the grid bin. Contemporaneous instances of communication error can be stored separately from historic instances of communication error within communication error storage 108. This enables error identification system 102 to easily distinguish contemporaneous instances of communication error from historic instances thereof.

Error identification system 102 can comprise a data analysis component 110 configured to compare contemporaneous instances of communication error with historic data stored at database 104. Particularly, data analysis component 110 can compare contemporaneous and historic data at least as a function of geographic location. Thus, for instance, contemporaneous communication error instances within a particular grid bin or a cluster of grid bins can be compared with historic data for the same grid bin(s). This enables data analysis component 110 to isolate potential service outages as a function of geographic area, independent of network infrastructure (e.g., independent of base station location or radio tower location, etc.). In some aspects, historic data can be limited to a particular time interval, such as the prior week, prior month, prior year, etc. Furthermore, historic data can be parsed to isolate data within a particular time period, such as a particular day of the week, a particular time of day, a particular season of the year, and so on. This enables contemporaneous data compiled, for instance, at 5:00 pm on a Thursday to be compared with historic data compiled at a similar time, or on a similar day, or the like, or suitable combinations thereof.

Comparison of contemporaneous and historic data can be performed by data analysis component 110 to identify a deviation condition, defined by a function, between contemporaneous and historic instances of communication error. The function utilized to identify the deviation condition can be service provider configurable according to some aspects of the subject disclosure, to give service providers flexibility in establishing a threshold for determining a potential service outage. In at least one aspect, the function can be a statistical function having a threshold statistical deviation between contemporaneous data and historic data that satisfies the deviation condition.

In addition to the foregoing, error identification system 102 can comprise a location component 112 configured to identify a geographic area experiencing a service outage in response to data analysis component 110 identifying the deviation condition. In one aspect, location component 112 can simply identify a grid bin or cluster of grid bins for which the deviation condition was identified, as the geographic area experiencing the service outage. In an alternative aspect, location component 112 can reference nearby grid bins or clusters of grid bins in addition to the bin(s) for which the deviation condition was identified, to determine if data analysis component 110 has identified a deviation condition for any nearby grid bin(s). If so, the geographic area experiencing the service outage can be identified as the grid bin(s) and nearby grid bin(s). In at least one particular aspect, a different function (e.g., a statistical function) can be employed for aggregating nearby grid bins into the geographic area once a deviation condition has been identified for at least one other grid bin(s). Said differently, a first function can be employed having a first statistical threshold for determining a deviation condition in a grid bin or cluster of grid bins. Once such a deviation condition is determined, location component 112 can employ a second function having a second statistical threshold for determining whether nearby grid bins are also experiencing effects of a service outage associated with the deviation condition. Grid bins identified by this second function can be included in the geographic area, according to this particular aspect(s).

Once the geographic area is identified by location component 112, data analysis component 110 can generate a geographic repair ticket 114 for the geographic area according to one aspect of the subject disclosure. In an alternative or additional aspect, generating the repair ticket can be subject to a condition that a ticketing entity of mobile network 106 has not issued a repair ticket for a base station within the geographic area. According to a further aspect, the ticketing entity can issue the repair ticket for the geographic area rather than data analysis component 110. In either case, the geographic area associated with geographic repair ticket 114 can be identified independent of location of network infrastructure equipment (e.g., a particular grid bin or cluster of grid bins). This can enable repair personnel to more easily locate, identify and troubleshoot problems that do not originate at a base station or radio tower. Since the radio tower is only a small fraction of area within a sector or cell, the conventional approach is not helpful in determining intra-cell or intra-sector problems. The subject disclosure, on the other hand, can provide substantially greater geographic resolution in identifying a location of a service outage. According to one example, the resolution can be as small as one grid bin.

Figure 2:
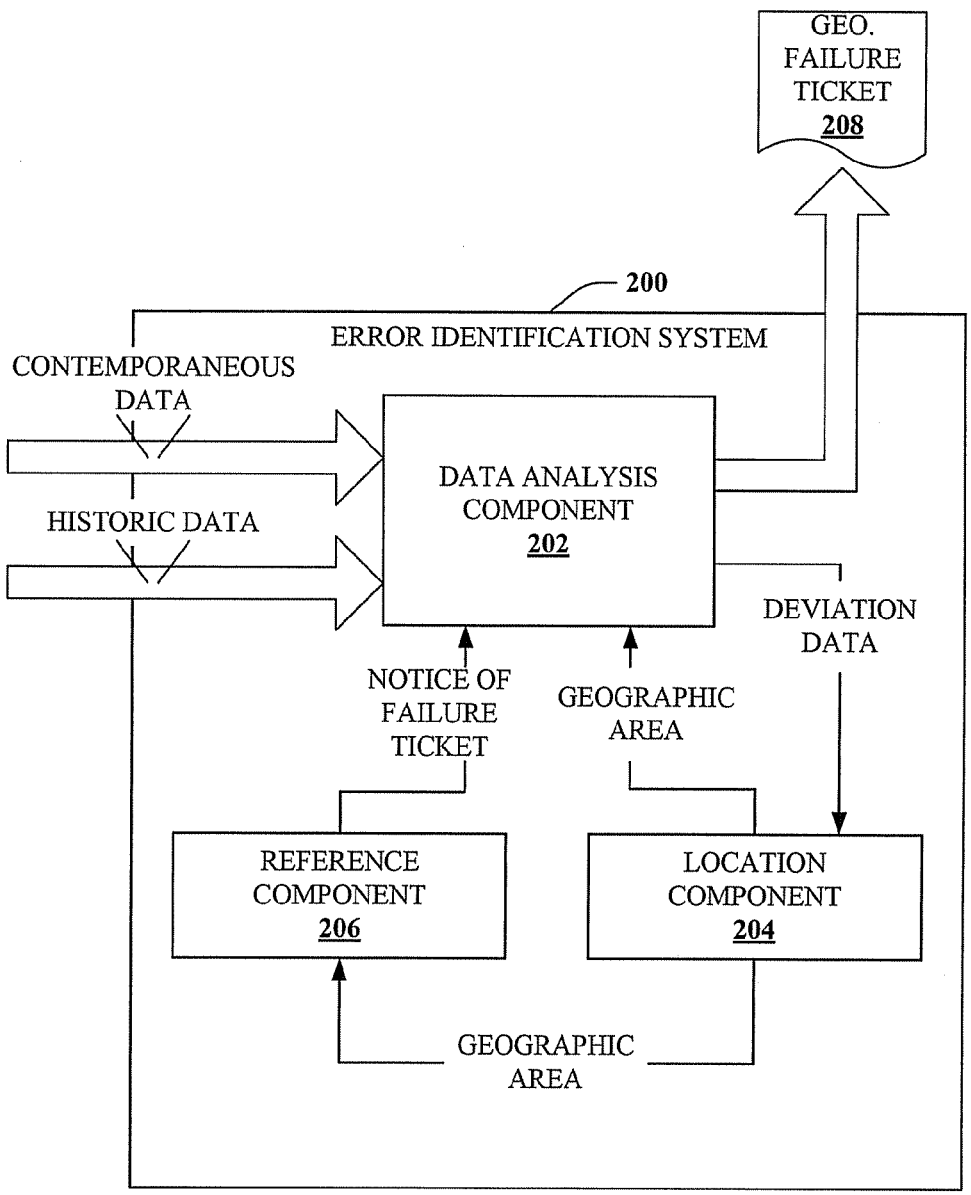
FIG. 2 depicts a block diagram of a sample system that compares contemporaneous and historic instances of call drops to identify anomalous conditions.

FIG. 2 depicts a block diagram of a sample error identification system 200 for identifying and ticketing service outages for a mobile network, according to further aspects of the subject disclosure. Particularly, error identification system 200 can be configured to identify geographic locations experiencing communication errors, independent of location of RAN infrastructure and with greater geographic resolution than the size of a cell or sector itself. Further, error identification system 200 can be configured to generate error tickets particularly for respective geographic areas experiencing errors, giving repair personnel a more accurate information to pinpoint a source of the error in many instances (e.g., where the geographic area can be identified with greater precision than a cell or sector size).

Error identification system 200 can comprise a data analysis component 202. Data analysis component 202 can be configured to receive contemporaneous and historic data pertaining to instances of communication error (e.g., dropped calls) that occur within a mobile network. Particularly, the contemporaneous instances can be acquired periodically (e.g., hourly, etc.) and compared with the historic data, to determine whether a service outage is currently affecting a subset of the network.

Further to the above, instances of communication error can be associated with position information, identifying a position (e.g., a grid bin(s)) in which respective instances occur. Data analysis component 202 can be configured to compare instances of communication error associated with each grid bin, either alone or in conjunction with other instances in a cluster of grid bins near the grid bin, to historic instances of communication error associated with each respective grid bin. According to particular aspects of the subject disclosure, a cluster of grid bins can be employed where insufficient instances of communication error exist within a given grid bin to have statistical relevance. Further, the size of respective clusters can be chosen so that sufficient numbers of dropped calls can be associated with each grid bin to be statistically relevant (e.g., see FIG. 3, infra). As a particular example, where particular grid bins have a suitable number of instances of communication error, a cluster size can be a single grid being analyzed. Where the single grid bin does not have enough instances of communication error, a first tier cluster including bins immediately adjacent or diagonal to the grid bin can be identified, and all instances of communication error within the first tier cluster can be associated with the single grid bin. Since every grid bin in a network of grid bins can have a unique first tier cluster, this can be performed for any grid bin, as needed. Where a first tier cluster produces an insufficient number of communication errors, a second tier cluster can be employed (e.g., including grid bins immediately adjacent or diagonal to the grid bin, as well as grid bins immediately adjacent or diagonal to a first tier grid bin), and so on. In at least one aspect of the subject disclosure, the contemporaneous or historic data can be received at data analysis component 202 already having statistically significant instances of communication error (e.g., data from appropriately assigned clusters having been assigned to each bin as needed).

If a suitable deviation in contemporaneous and historic data is identified for a particular grid bin, data analysis component 202 can send a deviation notice to a location component 204, which is configured to identify a geographic region in which the deviation exists. As described herein, this geographic region can be limited to the grid bin in which the deviation condition occurs, or can include one or more surrounding grid bins as well. The geographic area, once determined, is sent to data analysis component 202 in response to the deviation notice. Furthermore, the geographic area can be sent to a reference component 206 to determine whether the particular deviation has already been flagged by a mobile network.

Reference component 206 can be configured to access a mobile network server (e.g., a base station ticketing server) and determine whether a base station failure associated with the deviation exists. This can be accomplished by accessing infrastructure location data from the mobile network server and identifying what base stations are within or adjacent to the geographic area identified by location component 204. Upon identifying these base stations, reference component 206 can query the mobile network server to determine whether a repair ticket identifying any of these base stations exists. If not, reference component 206 can send a notice to data analysis component 202 that no failure ticket for this geographic area exists. In this case, data analysis component 202 will generate and issue a geographic repair ticket 208 identifying the geographic area, as provided by location component 204. If a repair ticket does exist for any such base station, reference component 206 notifies data analysis component 202 of such notice, and no geographic repair ticket 208 is issued for this particular deviation. In at least one alternative example, reference component 206 can request the mobile network server to issue the geographic repair ticket, where such mobile network server is configured to issue a ticket identifying a geographic area independent of base station infrastructure equipment.

Figure 3:
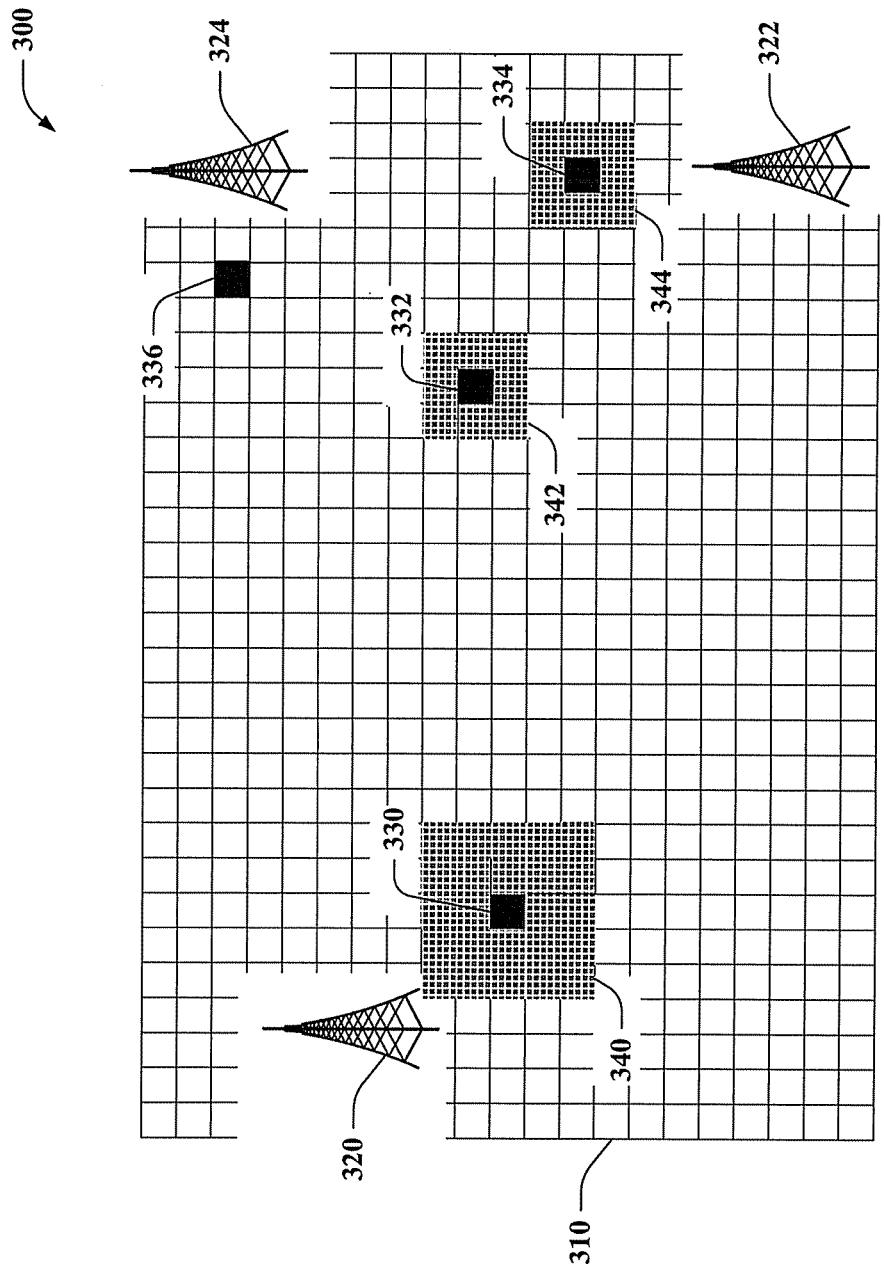
FIG. 3 illustrates a diagram of example cluster sizes in a geographic grid according to particular aspects of the subject disclosure.

FIG. 3 illustrates a diagram of a sample characterization of a geographic area served by a mobile network according to one or more additional aspects of the subject disclosure. Particularly, FIG. 3 includes a network 300 of discrete and contiguous grid bins 310. As depicted by network 300, grid bins 310 are squares, although other suitable two-dimensional shapes can be utilized in addition, or instead (e.g., rectangles, triangles, ovals, circles, polygons, irregular shapes, or the like). In a particular aspect, suitable three-dimensional shapes can be utilized instead, for a three-dimensional network 300 of grid bins.

Particular grid bins 310 of network 300 represent distinct geographic subsets of a total geographic area covered by a RAN, which includes base stations 320, 322 and 324. In the context of the subject disclosure, instances of communication error can affect mobile terminals located within particular grid bins 310 of network 300. Locating the mobile terminal with respect to a particular grid bin can facilitate geographically locating respective instances of communication error as well. Periodically, respective grid bins 310 can be analyzed to determine how many instances of communication error have occurred within a geographic area represented by each of the respective grid bins 310 within the period. The instances can be compared with historic data to determine whether a statistically anomalous number of communication errors have occurred for a given grid bin(s) 310, as described herein.

According to one or more aspects of the subject disclosure, size in geographic area of subsets of grid bins 310 can be set to different area values (even though FIG. 3 depicts grid bins of uniform size). The sizes can be selected at least in part from physical spacing between adjacent base station sites, to provide geographic resolution smaller than a given cell or sector size. Thus, in a region where cells are multiple kilometers in area, for example, near base station 320, a grid bin 330 can have a size of about 500-600 square meters, or more. In a region where cells are about a kilometer in size, for example near base stations 322 and 324, a grid bin 332 can have a size of about 200-300 square meters. In a region where cells are only several hundred meters apart or less, a grid bin 336 could have a size of about 100 square meters or less.

To collect a statistically significant amount of data, clusters of grid bins 340, 342, 344 can be formed for data aggregation purposes near a particular grid bin (grid bins 330, 332 and 334, respectively. As an example, where few instances of communication error occur for grid bin 330 within a given period, a cluster 340 of grid bins can be established around grid bin 330, and some or all instances of communication error occurring within cluster 340 can be assigned to grid bin 340. Similar clusters can be established about other grid bins 310 of network 30, which have few instances of communication error associated with them. Cluster 340 is referred to herein as a second tier cluster. A second tier cluster includes a target grid bin, in this case grid bin 330, first tier grid bins—including all grid bins immediately adjacent to or diagonal to the target grid bin—as well as second tier grid bins—which includes all grid bins adjacent to or diagonal to the first tier grid bins. Note that for network 300 having uniformly sized contiguous squares for the depicted grid bins, a first tier cluster will include 9 grid bins (the target grid bin plus 4 adjacent and 4 diagonal grid bins), the second tier cluster will include the 9 grid bins of the first tier cluster plus 16 additional grid bins (4 that are diagonal to first tier grid bins and 12 that are adjacent to first tier grid bins) for a total of 25 grid bins. A third tier cluster will have a total of 49 grid bins, and so on.

In a region of the mobile network having a relatively large terminal population density and therefore a greater number of communication errors, smaller clusters can be used. For grid bins 332 and 334, first tier clusters 342 and 344, respectively, are formed for aggregating communication error data. For grid bin 336, on the other hand, no cluster is formed; this could occur where instances of communication error associated with grid bin 336 are statistically significant by themselves.

Numbers of communication errors considered to be statistically significant can be configured by a network service provider. This provides some flexibility over data aggregation thresholds. As is discussed in more detail at FIG. 4, infra, clusters of grid bins for purposes of aggregating communication error data need not be regular shapes such as first tier cluster 342 or second tier cluster 340. Rather, logic for implementing customized or irregularly shaped clusters can be employed in addition or instead.

Figure 4:
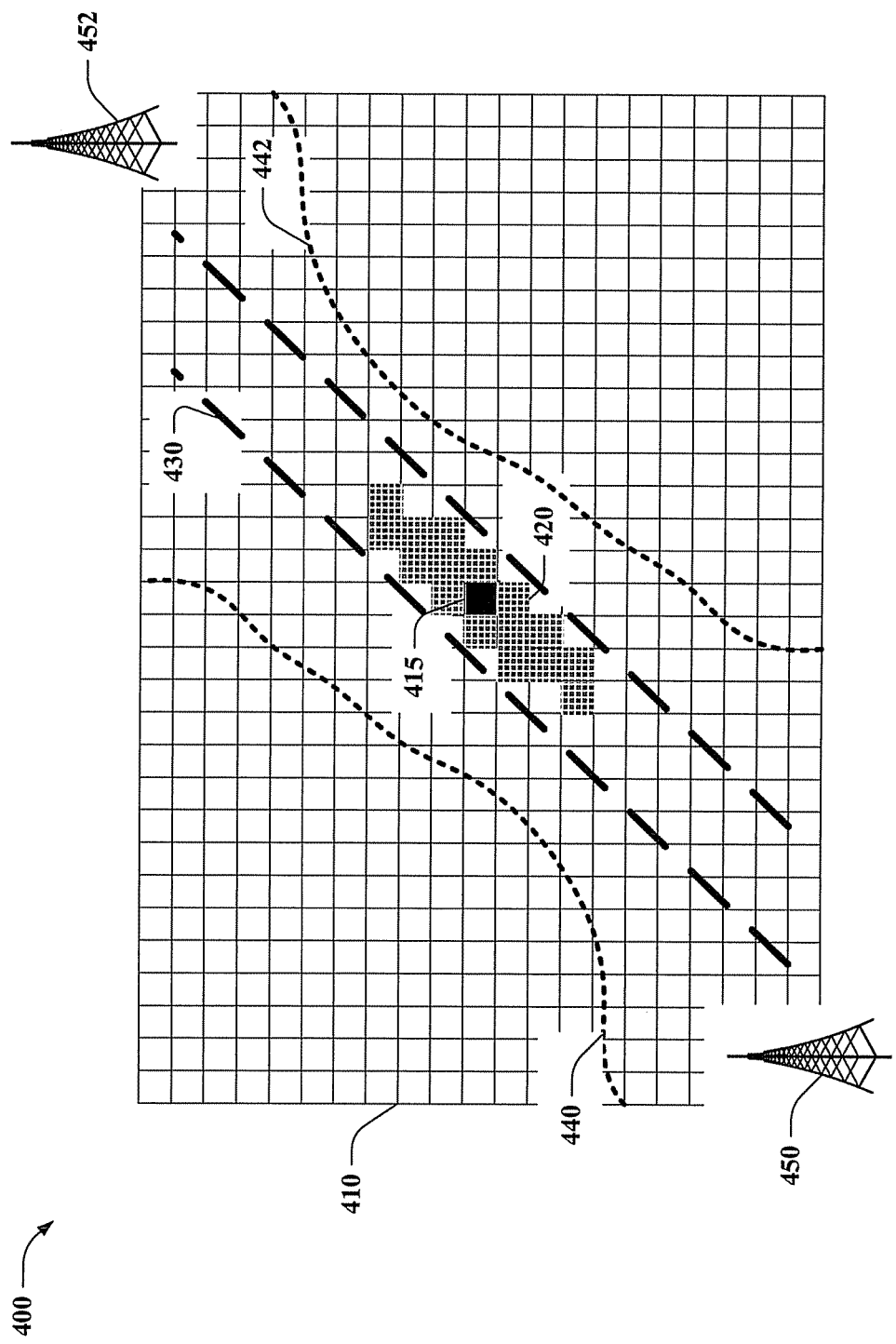
FIG. 4 depicts a diagram of an example irregular cluster shape for excluding non-relevant portions of a geographic area, in particular aspects.

FIG. 4 illustrates a diagram of an example geographic area 400 comprising a network of grid bins 410 according to still other aspects of the subject disclosure. Geographic area 400 depicts an example region in which non-uniform call densities can be likely to occur. Geographic area 400 can include a narrow region 430 having significant terminal population density, such as a highway, bridge, or the like, bounded by regions 440, 442 with no significant terminal population density, for example, two edges 440, 442 of a body of water, a desert, or other uninhabited region. A set of base stations 450, 452 provide wireless service for geographic area 400.

Various aspects described herein include acquiring contemporaneous and historic communication error data from discrete subsets of a geographic area served by a mobile network. As described above with respect to FIG. 3, a region having some non-zero terminal population density can render statistically significant communication error data by expanding an area—or cluster—about a particular grid bin from which data is collected for that grid bin. Where an area about the particular grid bin has no statistically significant terminal traffic, however, incorporating data from this area can improperly skew data results.

As depicted by FIG. 4, an irregularly shaped cluster 420 can be established for a target grid bin 415 near a region (440, 442) of statistically insignificant grid bins 410. The irregularly shaped cluster 420 can be configured (e.g., shaped), so as to collect significant communication error data for the target grid bin 415. For instance, grid bins 410 within a selected distance of target grid bin 415 (e.g., first tier grid bins, second tier grid bins, and so on) having at least one instance of communication error, or that are adjacent to or diagonal to a grid bin having at least one instance of communication error, can be included within irregularly shaped cluster 420. Grid bins 410 having no instances of communication error and that are not adjacent to or diagonal to such a grid bin can be excluded from irregularly shaped cluster 420. Irregularly shaped cluster 420 illustrates an example of qualifying grid bins as shaded squares around target grid bin 415. Note that generally an irregularly shaped cluster according to the above or similar definition could reflect terminal density population or call density population data for a given region. Thus, predictably, irregularly shaped cluster 420 reflects a shape of the narrow region 430 having significant terminal population density, and does not include grid bins significantly outside narrow region 430. It should be appreciated that irregularly shaped cluster 420 is merely an illustrative example, and other irregular shapes and defining criteria for determining, statistically or otherwise, size and extent of irregularly shaped clusters known in the art or made known to one of skill in the art by way of the context provided herein are considered within the scope of the subject disclosure.

Figure 5:
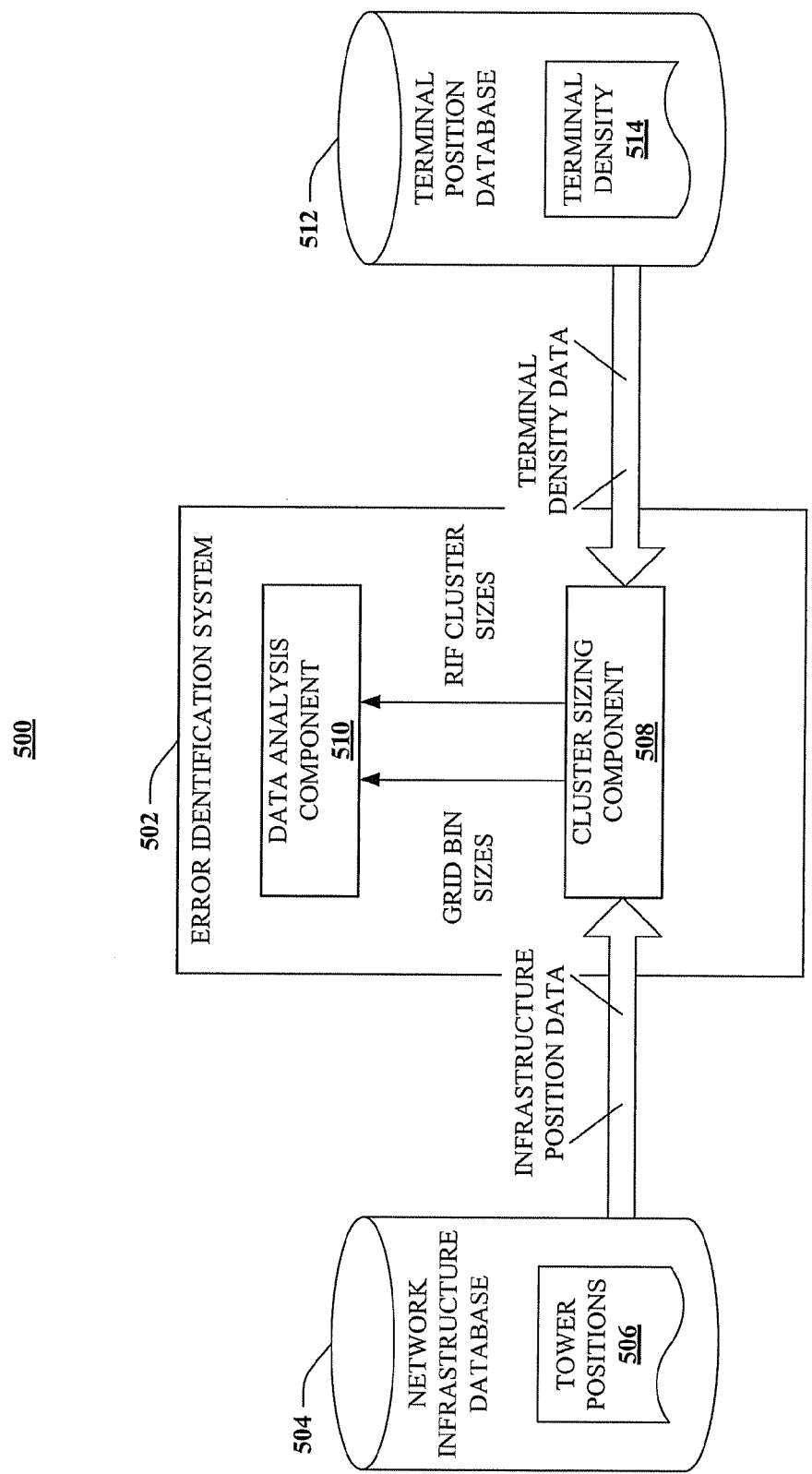
FIG. 5 illustrates a block diagram of a sample system that employs infrastructure spacing and terminal density to determine geographic bin and cluster size.

FIG. 5 illustrates a block diagram of an example system 500 that facilitates acquiring statistically significant communication error data for a geographic area, according to one or more further aspects of the subject disclosure. System 500 can comprise an error identification system 502 configured to analyze instances of communication error within a mobile network and identify locations of potential service outages from the analysis. In a particular aspect of the subject disclosure, error identification system 502 can be configured to establish a network of grid bins for mapping the geographic area, and selecting suitable grid bin sizes or shapes, and selecting suitable cluster sizes or shapes, for acquiring statistically significant data for the analysis.

Error identification system 502 can be communicatively connected with a network infrastructure database 504 that includes tower position data storage 506. Tower position data storage 506 can comprise information pertaining to geographic locations of RAN hardware associated with a mobile network. This can include geographic locations of radio towers, individual base stations, base station repeaters, and so on. The geographic location information is provided to error identification system 502, and leveraged by a cluster sizing component 508 to determine cell sizes and sector sizes for various cells/sectors of the mobile network. From the cell and sector sizes, cluster sizing component 508 can be configured to select suitable grid bin sizes (e.g., defining an amount of area represented by a particular grid bin) for the various cells/sectors of the mobile network. Generally, larger grid bin sizes are selected for larger cells/sectors, to provide a geographic granularity more accurate than the cell/sector itself. Respective grid bin sizes are provided to a data analysis component 510 for use in analyzing communication error data for the mobile network.

In addition to the foregoing, system 500 can include a terminal position database 512. Terminal position database 512 can include a terminal density storage 514 that stores density information for a dynamic population of subscriber terminals associated with the mobile network. Terminal position database 512 can store current terminal density information, or historic terminal density information, or both. The terminal density data is provided to cluster sizing component 508, which analyzes terminal density information for various regions of the mobile network to select suitable cluster sizes for aggregating communication error data for particular grid bins, as described herein. The cluster sizes can be selected based at least in part on the terminal density data (optionally in conjunction with communication error data) to provide statistically significant communication error data for each grid bin of the network of grid bins. The cluster sizes are provided to data analysis component 510 to use in conjunction with aggregating and analyzing communication error data for each grid bin of the geographic area.

Figure 6:
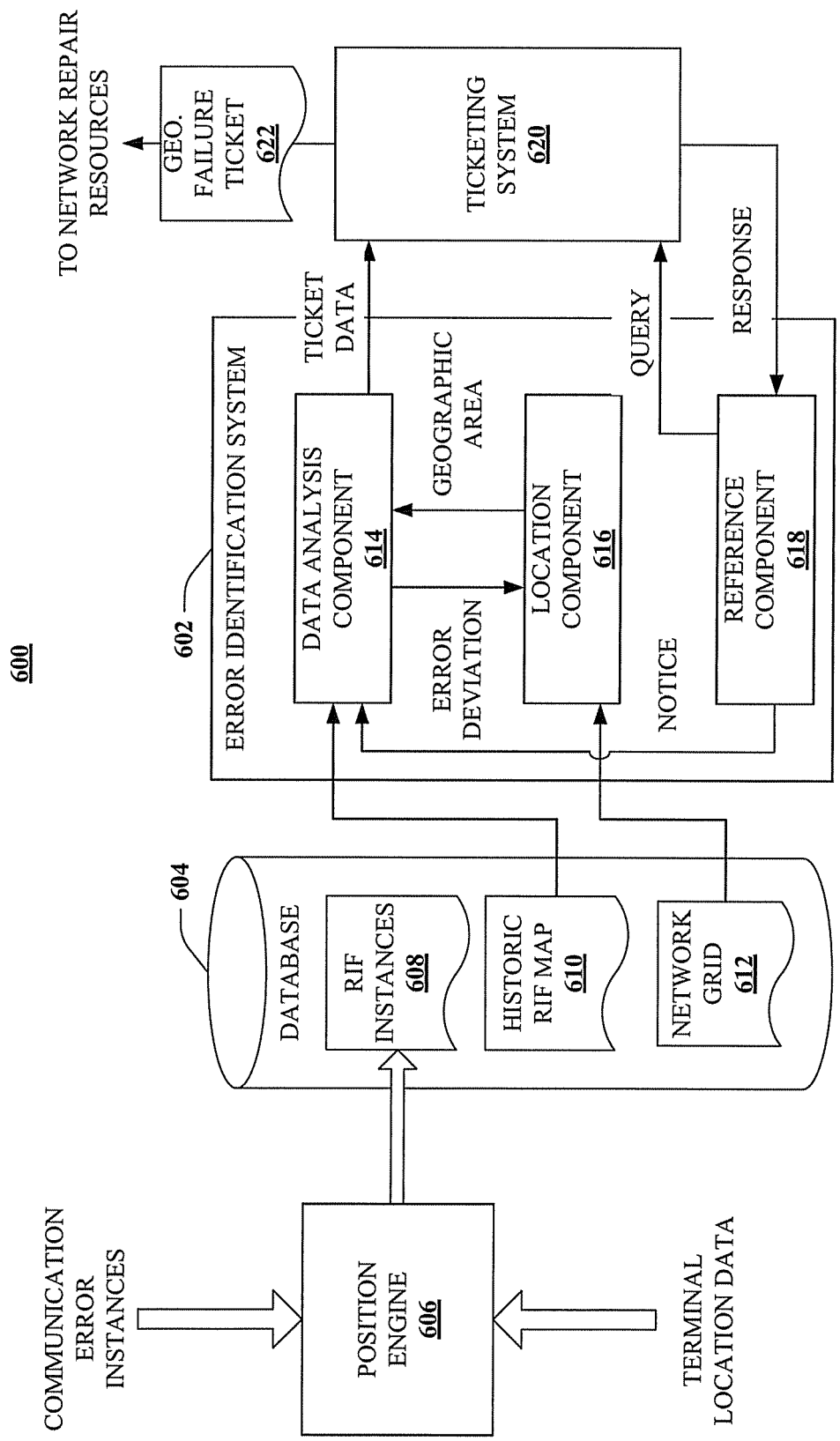
FIG. 6 depicts a block diagram of an example system that provides error ticketing based on geolocated event data according to various disclosed aspects.

FIG. 6 illustrates a block diagram of a sample system 600 that provides mobile network repair ticketing that targets geographic areas within a mobile network according to still other aspects of the subject disclosure. Further, respective geographic areas identified by respective mobile network repair tickets can be defined or described independent of network infrastructure location (e.g., location of radio towers, base stations, network cells, network sectors, or the like), and with sub-sector geographic resolution. Accordingly, system 600 can provide significant advantages for repair personnel in identifying and locating source of RIFs within the mobile network, as compared with conventional approaches.

System 600 can include an error identification system 602 for identifying geographic location of service outages within a mobile network coverage area. Identifying a service outage can be implemented at least in part by analysis of instances of RIFs as a function of time and of location with the mobile network coverage area. If a service outage is identified, error identification system 602 can determine whether an active base station service ticket exists near or within the service outage. If not, a geographic service ticket is issued identifying at least the location of the identified service outage. Particularly, this location can be defined without reference to base station location or location of cells/sectors of the mobile network.

Error identification component 602 can be communicatively connected with a database 104 for storing data pertaining to instances of RIFs for the mobile network. A position engine 606 can receive information regarding instances of RIFs for the mobile network, as well as terminal location data associated with respective instances of RIFs. In one example, the terminal location data can comprise a reported position provided by a location aware mobile terminal. In another example, the terminal location data can comprise signal timing and delay information assisted by one or more location aware mobile terminals for a cell or sector reporting an instance of a RIF. In the former case, position engine 606 can reference a network grid 612 stored in database 604 and map respective reported positions to respective grid bins of network grid 612. In the latter case, position engine 606 can calculate respective position locations of mobile terminals (e.g., including location aware and non-location aware terminals) from the signal timing and delay information for a given cell or sector, and map respective calculated position locations to network grid 612.

In at least one aspect of the subject disclosure, position engine 606 can be configured to acquire relatively accurate location information for mobile terminals. Some mobile terminals operating within a mobile network can be equipped with global positioning system (GPS) units, assisted GPS, satellite positioning systems such as global navigational satellite system (GLONASS) or the like. These mobile terminals having capability to determine their own location within a suitable accuracy (a threshold of which can be set by a service provider, e.g., within 100 meters or less, 50 meters or less, 20 meters or less, etc.) are referred to herein as location-aware terminals. In some aspects of the subject disclosure, position engine 606 can query location-aware mobile terminals to report their location, or position engine 606 can simply acquire location information submitted by these terminals and stored in a network database (not depicted), such as location information submitted according to mobile communication standards. As described in more detail below, this reporting can be leveraged to then determine accurate timing and delay information for wireless signals within a given sector, which in turn can be utilized to locate non-location aware terminals (terminals without GPS, AGPS, GLONASS, or other location systems), or location-aware terminals that are configured to not report their respective locations. Thus, position engine 606 can be configured to determine terminal location data for a mixed population of location aware and non-location aware terminals, in at least one aspect of the subject disclosure.

Timing of wireless signals generally takes into consideration the time from wave signal generation, or output at a radio transmitter (e.g., a mobile terminal or base station), to detection at a receiver (e.g., a base station, a mobile terminal). Such timing includes site timing through link(s) to antenna(s), and propagation time over the air interface or wireless channel. Timing delay typically is caused by various sources, including equipment hardware factors, as well as environmental conditions within a given sector. From the hardware perspective, sources of delay can include, e.g., mismatches among electronic elements and components (e.g., impedance mismatch), stray capacitance and inductance, length of the antenna(s) cable(s) in a base station(s); tower height of base station, and so on. Timing delay spread generally originates from any signal path scattering, or "signal bounces," such as multipath, strong reflections, etc.; and the like. In an aspect of the disclosed subject matter, timing and delay errors can be compensated for where the errors in delay and timing can be quantified. Wherein better location measurements beget better timing measurements, aspects of the disclosed subject matter can, at least in part, contribute to improved network performance. Similarly, better timing measurements can be employed for better location determination. Further, it is noted that compensation of timing delay can depend on sector coverage, e.g., a first sector can be densely populated while a neighboring sector can include substantial areas of lower population density.

A time difference, 'C', observed at a mobile terminal includes both a cell site timing portion, 'A', and a RF propagation portion, 'B', such that A+B=C. Further, where cell site location and terminal location are known, the RF propagation time, B, can be deduced, e.g., B=(distance between terminal and cell site, divided by the speed of light). Thus, using the deduced RF propagation time, B, and observed terminal time difference, C, the cell site timing, A, can be calculated, as A=C−B. Site timing, A, is relatively stable over periods of hours to days for most modern network equipment. Therefore, once A is determined, C can be measured for additional terminals and the RF propagation time (i.e., B) for these additional terminals can be determined from B=C−A. RF propagation time, B, can then be converted into a distance (e.g., B*speed of light=distance) and, using multilateration techniques, respective positions of terminals can be identified.

Determining the values of B by geometry can be facilitated by knowledge of the location of a given base station and a given terminal. Generally, locations for planned deployments of base stations are typically known with high levels of precision, as these are normally permanent installations. Further, the location of a location aware terminal can be acquired with relatively high accuracy from the terminal itself (e.g., AGPS being generally accurate to within 5-10 meters). Thus a location aware terminal can facilitate the determination of A, as disclosed herein, such that a distance from a non-location aware terminal to the given base station can be derived from B=C−A, and converting B to this distance. Using multilateration techniques, a position of the non-location aware terminal in a macro cell can then be calculated with far greater accuracy than in conventional multilateration approaches. In experiments, these measurements can produce location accuracies for non-location aware terminals with median errors of <70 m in suburban areas. Multilateration incorporates compounding errors, however. Further, multilateration is also computationally significant (e.g., involves hyperbolic functions between NodeB site pairs (NBSPs) at (N−1)!, where N is the number of cell sites; for example, 5 cell sites would involve 24 simultaneous hyperbolic functions.) Timed fingerprint locating (TFL), for instance as disclosed in co-pending U.S. patent application Ser. No. 12/712,424—incorporated by reference herein in its entirety—can reduce computational complexity and provide pre-computed values in lookup tables to facilitate improved location techniques.

TFL information can include location or timing information as disclosed in more detail in incorporated U.S. patent application Ser. No. 12/712,424 filed Feb. 25, 2010. The location or timing information can be utilized to generate TFL location information for a UE. The TFL information can be information from systems in a timed fingerprint location wireless environment, such as a TFL component of a wireless telecommunications carrier. As a non-limiting example, a mobile device, including mobile devices not equipped with a GPS-type system (e.g., a non-location aware mobile device), can be located by looking up timing information associated with the mobile device from a TFL information reference.

In an aspect, TFL information can include information to determine a differential value for a NBSP and a bin grid frame, as disclosed in more detail in incorporated U.S. patent application Ser. No. 12/712,424. A centroid region (possible locations between any site pair) for an observed time value associated with any NBSP can be calculated and is related to the determined value (in units of chip) from any pair of NodeBs. When UE time data is accessed, a value look-up can be initiated (e.g., a lookup for "DV(?,X)" as disclosed in more detail in the above patent application incorporated herein by reference). Relevant NBSPs can be prioritized as part of the look-up. Further, the relevant pairs can be employed as an index to lookup a first primary set. As an example, time data for a UE can be accessed in relation to a locating event in a TFL wireless carrier environment. In this example, it can be determined that a NBSP, with a first reference frame, be used for primary set lookup with the computed DV(?,X) value as the index. This can for example return a set of bin grid frame locations forming a hyperbola between the NodeBs of the NBSP. A second lookup can then be performed for an additional relevant NBSP, with a second reference frame, using the same value DV(?,X), as an index into the data set. Continuing the example, the returned set for the look up with second NBSP can return a second set of bin grid frames. Thus, the UE is likely located in both sets of bin grid frames. Therefore, where the UE is likely in both sets, it is probable that the location for the UE is at an intersection of the two sets. Additional NBSPs can be included to further narrow the possible locations of the UE by providing additional intersections among relevant bin grid sets. Alternatively, or in addition, NodeB site groups comprising three, four, etc., NodeBs and associated sets of bin grid frames can be utilized to locate the UE at an intersection of two or more sets of bin grid frames to further refine location of the UE (e.g., by identifying an intersection of bin grid frames comprising fewer bin grids, or comprising bin grids having greater geographic resolution— such as 50 meter bin grids instead of 150 meter bin grids, etc.). As such, employing TFL information for location determination is demonstrably different from conventional location determination techniques or systems such as GPS, eGPS, triangulation or multilateration in wireless carrier environments, near field techniques, or proximity sensors. Regardless of how mobile terminal position is determined, respective RIF instances can be equated with respective bin grids in which respective associated mobile terminal geographic position is determined to be located within.

Contemporaneous instances of RIFs (e.g., instances acquired most recently, or acquired in a current acquisition period, or the like) and associated grid bin positions can be stored in a RIF instance storage 608. As new data is updated to RIF instance storage 608, database 604 can update a historic RIF map storage 610, which comprises a compilation of prior RIF data, parsed at least as a function of time period and of geographic location (e.g., grid bins). This data can be analyzed by error identification system 602 to determine whether statistical anomalies in instances of RIFs exist within a given geographic location (e.g., grid bin or set of grid bins). Optionally, statistical anomalies can be identified with reference to a similar time (e.g., time of day) or time period (e.g., day of the week) as contemporaneous data, and over a defined time interval (e.g., a week, a month, prior three months, prior year, or the like).

Error identification system 602 can comprise a data analysis component 614 configured to compare contemporaneous instances of communication error from RIF instance storage 608 with historic data stored at historic RIF map storage 610 to identify a deviation condition, defined by a function, between contemporaneous and historic data. An identified deviation condition is provided to a location component 616 configured to identify a geographic area experiencing a service outage in response to the data analysis component identifying the deviation condition. This geographic area is returned to data analysis component 614.

In addition to the foregoing, error identification system 602 can comprise a reference component 618. Reference component 618 can be configured to query a mobile network ticketing system 620 to determine whether a base station failure associated within or near the geographic area identified by location component 616 exists. A response to the query indicates whether any outstanding base station repair tickets in the geographic area indeed exist. Reference component 618 sends a notice to data analysis component 614 indicating a result of the response to the query.

If a base station repair ticket exists, data analysis component 614 can be configured to ignore the deviation condition. On the other hand, if no base station repair condition exists, data analysis component 614 can be configured to forward information about the deviation condition (e.g., number of instances of RIF, location information for respective instances of RIF, etc.) as well as information identifying the geographic area to mobile network ticketing system 620. In response to receiving this information, mobile network ticketing system 620 can be configured to generate a repair ticket for the geographic area. Moreover, this repair ticket can identify the geographic area irrespective of location of network infrastructure equipment of the mobile network. For instance, the geographic area can be defined by identifying one or more grid bins of a network of grid bins (e.g., see FIG. 3 or 4, supra) in which the geographic area resides.

The aforementioned systems have been described with respect to interaction between several systems, components or communication interfaces. It should be appreciated that such systems and components can include those components or sub-components specified therein, some of the specified components or sub-components, or additional components. For example, a system could include database 604, position engine 606, error identification system 602, cluster sizing component 508, and network infrastructure database 504 and terminal position database 512, or a different combination of these or other entities. Sub-components could also be implemented as modules communicatively coupled to other modules rather than included within parent modules. Additionally, it should be noted that one or more components could be combined into a single component providing aggregate functionality. For instance, reference component 206 can include location component 204, or vice versa, to facilitate identifying a geographic area for a RIF deviation condition and determining whether a base station repair ticket exists for the geographic area, by way of a single component. The components can also interact with one or more other components not specifically described herein but known by those of skill in the art.

Figure 7:
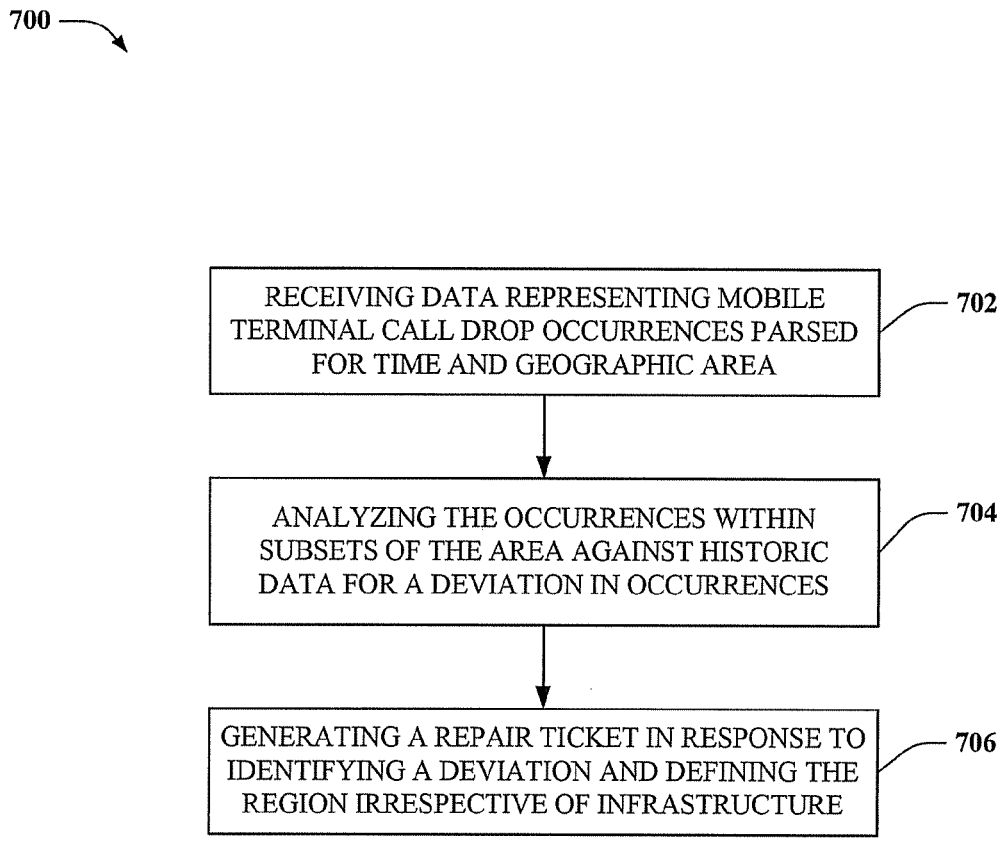
FIG. 7 illustrates a flowchart of a sample method for providing geographic error tickets for mobile communication errors according to further aspects.
Figure 8:
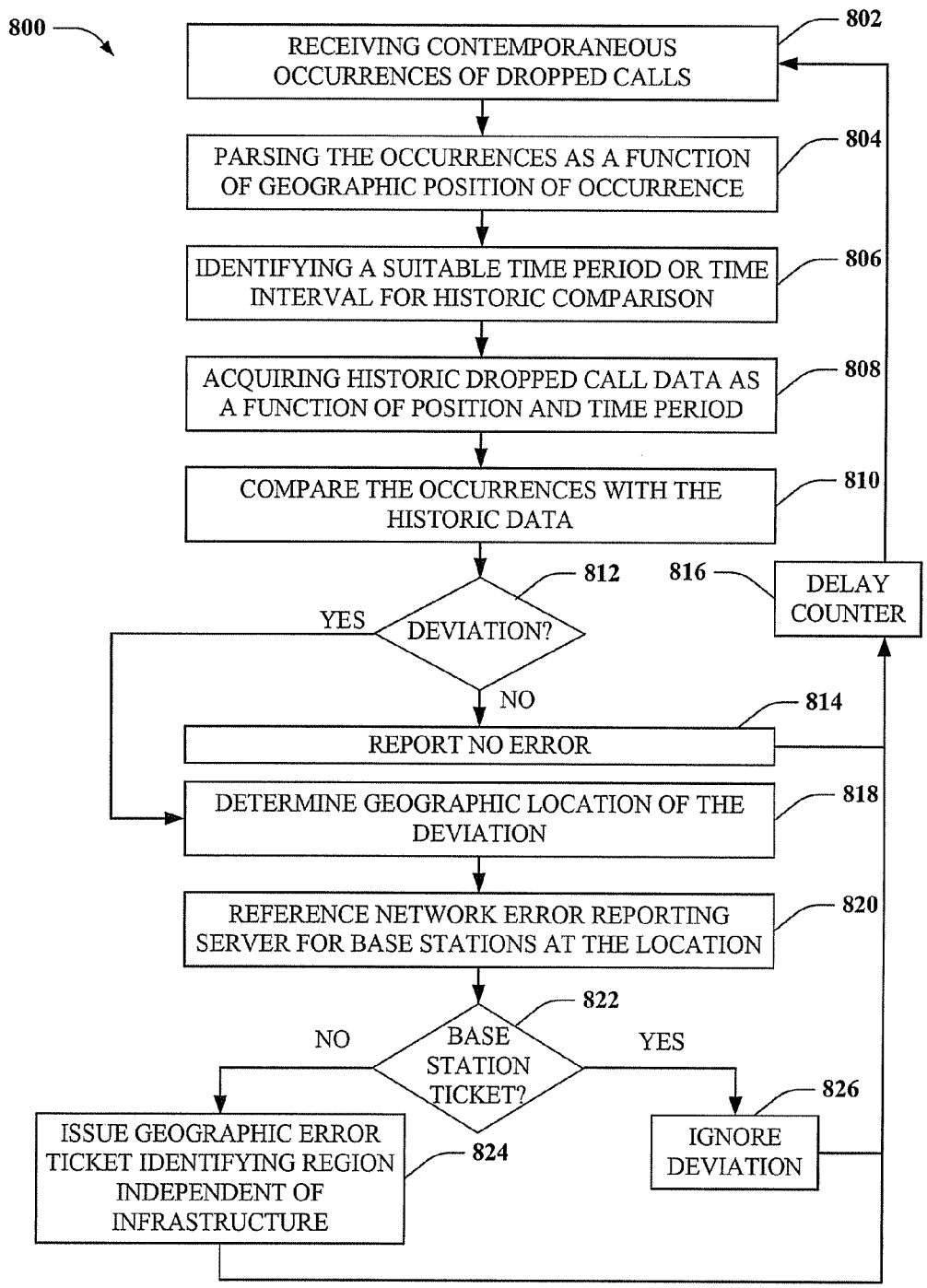
FIG. 8 depicts a flowchart of a sample method for providing comparing current and historic call drop data to identify geographic communication errors.
Figure 9:
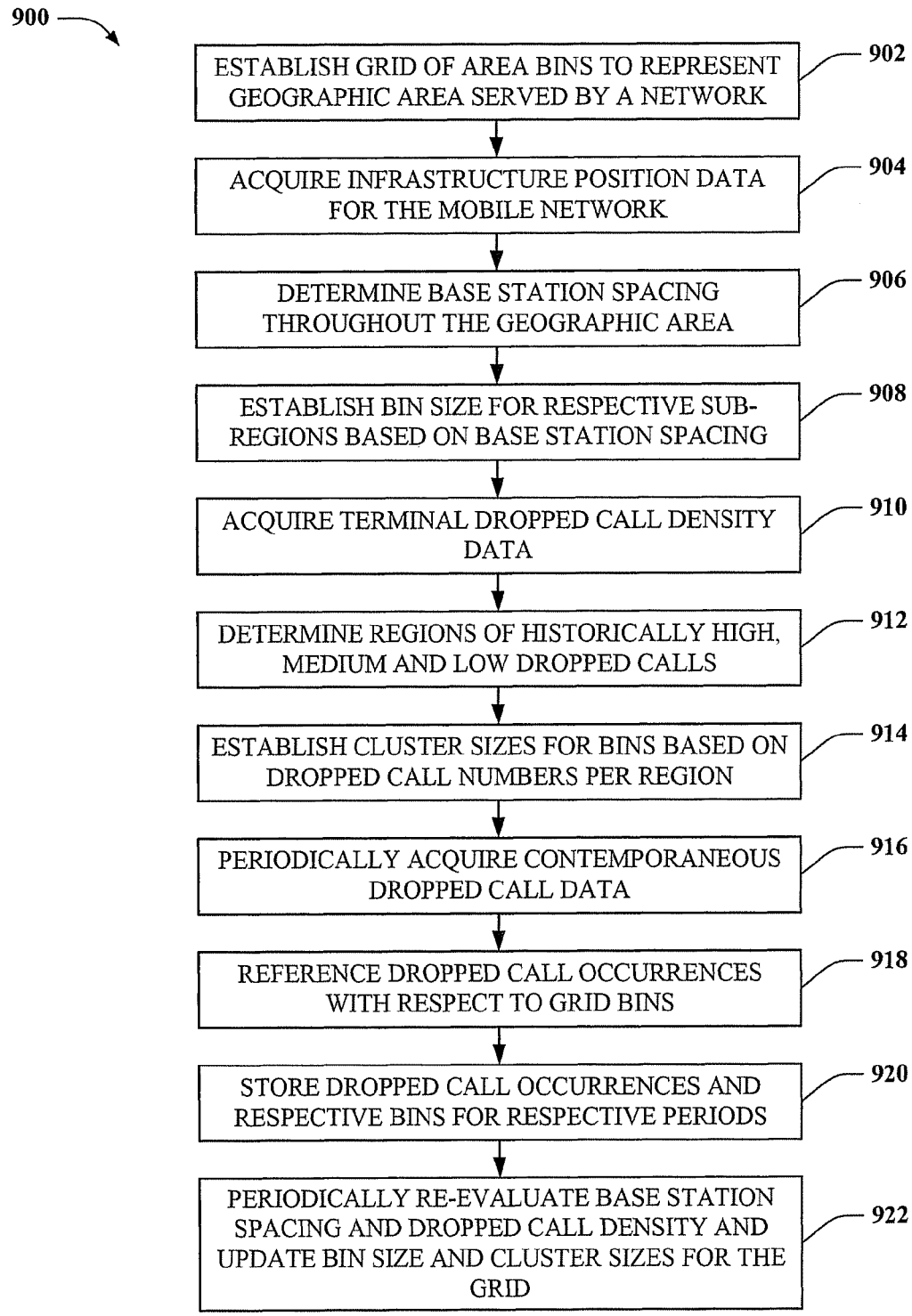
FIG. 9 illustrates a flowchart of an example method for acquiring geolocated mobile event data according to particular aspects of the subject disclosure.

FIGS. 7, 8, and 9 illustrate various methods in accordance with one or more of the various embodiments disclosed herein. While, for purposes of simplicity of explanation, the methods are shown and described as a series of acts, it is to be understood and appreciated that the various embodiments are not limited by the order of acts, as some acts may occur in different orders or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the various embodiments. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device, carrier, or media.

FIG. 7 depicts a flowchart of an example method 700 for providing maintenance ticketing for geographic areas served by a mobile network, according to one or more aspects of the subject disclosure. At 702, method 700 can comprise receiving data representing mobile terminal call drop occurrences that are parsed as a function of time and geographic area. The function of time can be a suitable time period, such as every ten minutes, every thirty minutes, every hour, twice a day, and so on. Moreover, the function of geographic area can include one or more discrete grid bins of a network of discrete and contiguous grid bins representing a geographic area served by the mobile network.

At 704, method 700 can comprise analyzing call drop occurrences within subsets of the geographic area against historic data for the mobile network. The analysis can apply a function defining a statistically significant deviation of call drop occurrences. Moreover this analysis can compare the call drop occurrences with historic data that is associated with respective similar geographic areas as the respective subsets of the geographic area, in at least one aspect of the subject disclosure. In alternative, or additional aspects, this analysis can compare the call drop occurrences with historic data in similar time periods. Examples of similar time periods can include a similar time of day, the same or similar day of the week, evening or business hours, weekday (e.g., Monday through Friday) or weekend, season of the year, and so on.

At 706, method 700 can comprise generating a repair ticket for a region of the geographic area in response to at least identifying the statistically significant deviation. In a particular aspect, generating the repair ticket can be conditioned on determining that no repair ticket has been issued by the mobile network for a base station or similar hardware in a vicinity of an identified deviation. According to further aspects, the repair ticket for the region of the geographic area can be configured to define the region irrespective of radio access network infrastructure, and with better geographic resolution than a single cell or sector of the mobile network. Accordingly, maintenance personnel can be directed toward a problem that does not originate at known hardware equipment of the mobile network, facilitating discovery of problems that are generally difficult to diagnose with conventional mechanisms.

FIG. 8 illustrates a flowchart of a sample method 800 according to one or more further aspects of the subject disclosure. At 802, method 800 can comprise receiving contemporaneous occurrences of dropped calls for a mobile network. At 804, method 800 can comprise parsing the occurrences of dropped calls as a function of geographic position of occurrence. At 806, method 800 can comprise identifying a suitable time period or time interval for historic comparison. At 808, method 800 can comprise acquiring historic dropped call data as a function of geographic position and time period for the mobile network. At 810, method 800 can comprise comparing the occurrences of dropped calls with the historic data.

At 812, method 800 can comprise determining whether a deviation condition exists between the occurrences of dropped calls and the historic data. The deviation condition can be based on a suitable statistical threshold, utilizing time, geographic area, or the like, or a suitable combination thereof, as parameters. If the deviation condition is identified for a subset of the occurrences of dropped calls, method 800 can proceed to 818. Otherwise, method 800 proceeds to 814.

At 814, method 800 can comprise reporting no service outage for the mobile network, and delaying for a delay counter period at 816. From reference number 816, method 800 can return to reference number 802. At 818, method 800 can comprise determining a geographic location of the deviation condition. At 820, method 800 can comprise referencing a network error reporting server for base stations within or near the geographic location. At 822, method 800 can determine whether a base station repair ticket exists for the base stations within or near the geographic location. If a repair ticket does exist, method 800 can proceed to 826 and ignore the deviation. If the repair ticket does not exist, method 800 can proceed to 824 and issue a geographic error ticket identifying the geographic region independent of network infrastructure. From 824 and 826, method 800 can proceed to 816 and delay for a delay counter period (e.g., equal to a period over which occurrences of dropped calls are compiled), before returning to reference number 802.

FIG. 9 illustrates a flowchart of a sample method 900 for acquiring statistically significant error data for instances of dropped calls within a mobile network, according to one or more additional aspects of the subject disclosure. At 902, method 900 can comprise establishing a grid of area bins to represent a geographic area served by a mobile network. At 904, method 900 can comprise acquiring infrastructure position data for the mobile network. At 906, method 900 can comprise determining base station spacing throughout the geographic area. At 908, method 900 can comprise establishing bin sizes for respective sub-regions of the geographic area based at least in part on the base station spacing. At 910, method 900 can comprise acquiring terminal density information for the mobile network. The terminal density information can include terminal call density information, terminal call drop density information, or the like, or a suitable combination thereof.

At 912, method 900 can comprise determining regions of historically high, medium and low dropped calls for the mobile network. At 914, method 900 can comprise establishing cluster sizes for area bins based on dropped call numbers for associated regions. At 916, method 900 can comprise periodically acquiring contemporaneous dropped call data. At 918, method 900 can comprise referencing occurrences of dropped calls with respect to area bins in which the occurrences happened. At 920, method 900 can comprise storing dropped call occurrences and respective area bins for respective data acquisition periods. At 922, method 900 can comprise periodically re-evaluating base station spacing and dropped call densities for the mobile network and updating area bin sizes and cluster sizes for the grid of area bins.

Figure 10:
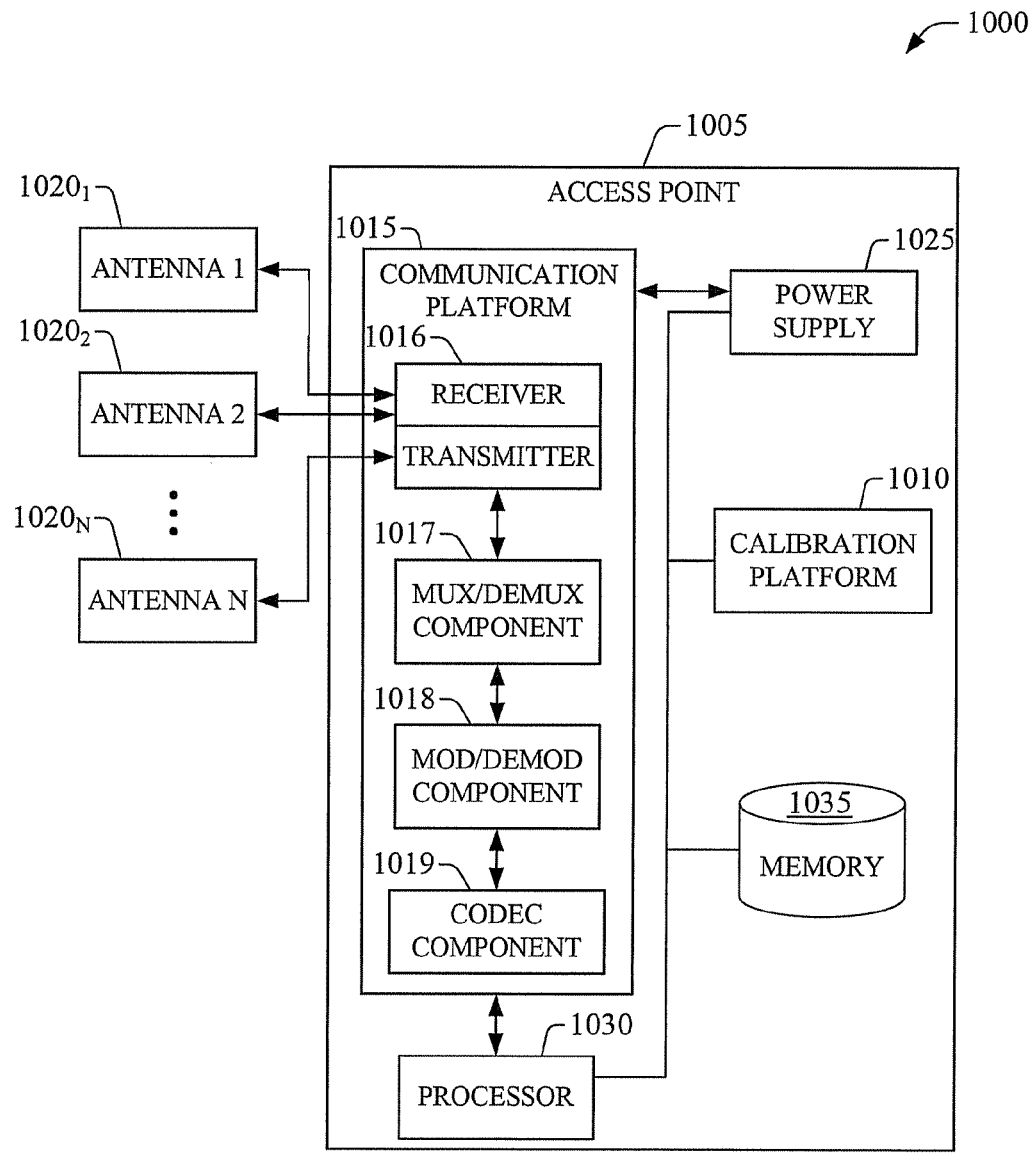
FIG. 10 depicts a block diagram of a sample network base station to implement or leverage one or more aspects described herein.

FIG. 10 illustrates a block diagram of an example embodiment of an access point to implement and exploit one or more features or aspects of the disclosed subject matter. In embodiment 1000, AP 1005 can receive and transmit signal(s) (e.g., attachment signaling) from and to wireless devices like femto access points, access terminals, wireless ports and routers, or the like, through a set of antennas $1020_1$-$1020_N$ (N is a positive integer). It should be appreciated that antennas $1020_1$-$1020_N$ can embody radio towers 320, 322, 324 or radio towers 450, 452, and are a part of communication platform 1015, which comprises electronic components and associated circuitry that provides for processing and manipulation of received signal(s) and signal(s) to be transmitted. In an aspect, communication platform 1015 includes a receiver/transmitter 1016 that can convert wireless signals from analog to digital upon reception, and from digital to analog upon transmission. In addition, receiver/transmitter 1016 can divide a single data stream into multiple, parallel data streams, or perform the reciprocal operation. Coupled to receiver/transmitter 1016 is a multiplexer/demultiplexer 1017 that facilitates manipulation of signal in time and frequency space. Electronic component 1017 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1017 can scramble and spread information (e.g., codes) according to substantially any code known in the art; e.g., Hadamard-Walsh codes, Baker codes, Kasami codes, polyphase codes, and so on. A modulator/demodulator 1018 is also a part of communication platform 1015, and can modulate information according to multiple modulation techniques, such as frequency modulation, amplitude modulation (e.g., M-ary quadrature amplitude modulation (QAM), with M a positive integer), phase-shift keying (PSK), and the like. Communication platform 1015 also includes a coder/decoder (codec) component 1019 that facilitates decoding received signal(s), and coding signal(s) to convey.

Access point 1005 also includes a processor 1035 configured to confer functionality, at least in part, to substantially any electronic component in AP 1005. In particular, processor 1035 can facilitate determination of propagation delay information of RF signal, or microwave signal, among communication platform 1015 and antennas $1020_1$-$1020_N$ in accordance with various aspects and embodiments disclosed herein. Power supply 1025 can attach to a power grid and include one or more transformers to achieve power level that can operate AP 1005 components and circuitry. Additionally, power supply 1025 can include a rechargeable power component to ensure operation when AP 1005 is disconnected from the power grid, or in instances, the power grid is not operating.

Processor 1035 also is functionally connected to communication platform 1015 and can facilitate operations on data (e.g., symbols, bits, or chips) for multiplexing/demultiplexing, such as effecting direct and inverse fast Fourier transforms, selection of modulation rates, selection of data packet formats, inter-packet times, etc. Moreover, processor 1035 is functionally connected, via a data or system bus, to calibration platform 1012 and other components (not shown) to confer, at least in part functionality to each of such components.

In AP 1005, memory 1045 can store data structures, code instructions and program modules, system or device information, code sequences for scrambling, spreading and pilot transmission, location intelligence storage, determined delay offset(s), over-the-air propagation models, and so on. Processor 1035 is coupled to the memory 1045 in order to store and retrieve information necessary to operate and/or confer functionality to communication platform 1015, calibration platform 1012, and other components (not shown) of access point 1005.

Figure 11:
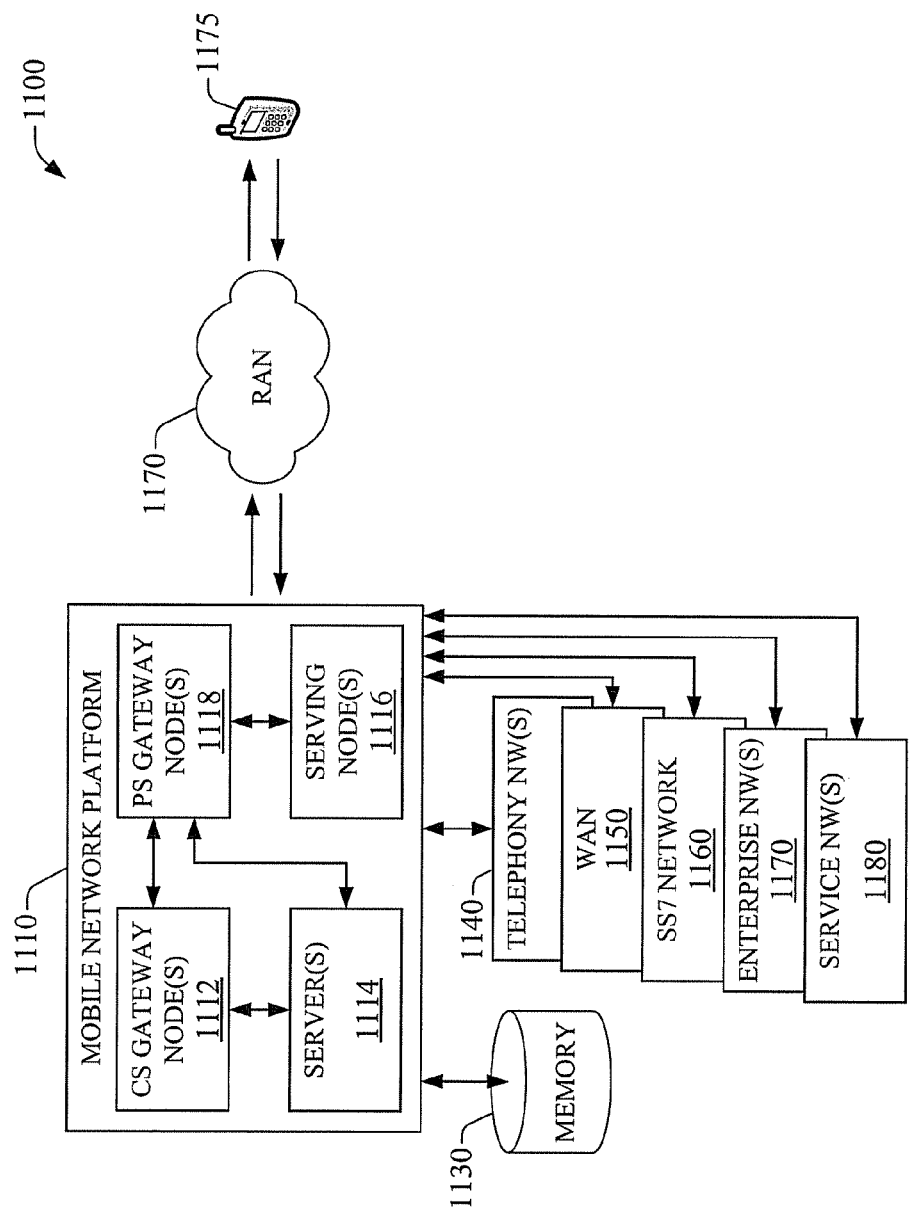
FIG. 11 illustrates a block diagram of an example mobile network platform to implement or exploit various disclosed aspects.

FIG. 11 presents an example embodiment 1100 of a mobile network platform 1110 that can implement and exploit one or more aspects of the disclosed subject matter described herein. Generally, wireless network platform 1110 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. Mobile network platform 1110 includes CS gateway node(s) 1112 which can interface CS traffic received from legacy networks like telephony network(s) 1140 (e.g., public switched telephone network (PSTN), or public land mobile network (PLMN)) or a signaling system #7 (SS7) network 1170. Circuit switched gateway node(s) 1112 can authorize and authenticate traffic (e.g., voice) arising from such networks. Additionally, CS gateway node(s) 1112 can access mobility, or roaming, data generated through SS7 network 1170; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication.

In the disclosed subject matter, in addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1160 can embody, at least in part, a service network(s) like IP multimedia subsystem (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s) 1117, convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications (e.g., location services, online gaming, wireless banking, wireless device management . . . ) that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150 or Global Positioning System (GPS) network(s) (not shown). Provisioning server(s) can also provision coverage through networks associated to wireless network platform 1110 (e.g., deployed and operated by the same service provider), such as femto cell network(s) (not shown) that enhance wireless service coverage within indoor confined spaces and offload RAN resources in order to enhance subscriber service experience within a home or business environment. Server(s) 1114 can embody, at least in part, error identification system 602 and database 604, as well as various other component(s) disclosed herein It is to be noted that server(s) 1114 can include one or more processors configured to confer at least in part the functionality of macro network platform 1110. To that end, the one or more processor can execute code instructions stored in memory 1130, for example. It is should be appreciated that server(s) 1114 can include a content manager 1115, which operates in substantially the same manner as described hereinbefore.

In example embodiment 1100, memory 1130 can store information related to operation of wireless network platform 1110. In particular, memory 1130 can include contents of database 104 in example system 100. Other operational information can include provisioning information of mobile devices served through wireless platform network 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1160, or SS7 network 1170.

It is to be noted that aspects, features, or advantages of the disclosed subject matter described in the subject specification can be exploited in substantially any wireless communication technology. For instance, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced. Additionally, substantially all aspects of the disclosed subject matter as disclosed in the subject specification can be exploited in legacy telecommunication technologies; e.g., GSM. In addition, mobile as well non-mobile networks (e.g., internet, data service network such as internet protocol television (IPTV)) can exploit aspects or features described herein.

Various aspects or features described herein can be implemented as a method, apparatus or system, or article of manufacture using standard programming or engineering techniques. In addition, various aspects or features disclosed in the subject specification also can be effected through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ).

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of systems and methods that provide advantages of the disclosed subject matter. It is, of course, not possible to describe every conceivable combination of components or methodologies for purposes of describing the disclosed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a memory to store computer-executable instructions; and
a processor communicatively connected to the memory that facilitates execution of the computer-executable instructions to perform operations, comprising:
storing instances of communication error associated with a mobile network including a set of network devices and respective geographic positions of user equipment devices affected by the instances of communication error;
comparing contemporaneous instances of the instances of communication error with stored historic data of historic instances of communication error to identify a deviation condition, defined by a function, between the contemporaneous instances and the historic instances of communication error;
determining a geographic area for the deviation condition defined independently from base station infrastructure positioning information of the mobile network;
referencing a base station error ticketing system to retrieve base station error ticketing data indicative of whether the base station error ticketing system has identified a base station error pertinent to the geographic area in response to the deviation condition being identified;
engaging a geographic error ticketing system for generating repair ticket data representative of a repair ticket in response to the deviation condition being identified and in response to the base station error ticketing data being indicative of the base station error ticketing system having not identified the base station error pertinent to the geographic area; and
canceling or delaying the generating the repair ticket data representative of the repair ticket at least in part in response to the base station error ticketing data being indicative of the base station error ticketing system not having identified the base station error pertinent to the geographic area.

2. The system of claim 1, wherein the operations further comprise identifying the geographic area to be experiencing a service outage in response to identifying the deviation condition for a subset of the contemporaneous instances of communication error.

3. The system of claim 2, wherein the operations further comprise identifying the base station error as pertinent to the geographic area at least in part based on proximity of the base station error to the geographic area.

4. The system of claim 1, wherein the instances of communication error comprise respective dropped calls affecting the user equipment devices.

5. The system of claim 1, wherein the operations further comprise characterizing the geographic area served by the mobile network as set of grid bins defined by a grid of discrete and contiguous two-dimensional shapes, wherein respective shapes of the discrete and contiguous two-dimensional shapes represent respective subsets of the geographic area having respective known locations.

6. The system of claim 5, wherein the operations further comprise locating the user equipment devices within the geographic area of the mobile network and facilitating storage by respective user equipment devices on behalf of the system.

7. The system of claim 6, wherein the locating is determinative of respective positions of the respective user equipment devices within a geographic resolution of approximately one grid bin of the set of grid bins.

8. The system of claim 7, wherein the respective positions of the user equipment devices are stored in association with respective grid bins of the set of grid bins in which the locating the user equipment devices determines the respective positions of the respective user equipment devices.

9. The system of claim 5, wherein grid bins of the set of grid bins located within a region of the mobile network are mapped to respective geographic areas having sizes that are determined from population densities of mobile terminals within the region, and wherein different regions, including the region, of different population densities have respective grid bins of differing sizes.

10. The system of claim 5, wherein grid bins of the set of grid bins are about 100 square meters in a first region with a first population density of a first set of mobile terminals, about 300 square meters in a second region with a second population density of a second set of mobile terminals, and about 500 square meters in a third region with a third population density of a third set of mobile terminals.

11. The system of claim 5, wherein the operations further comprise:
aggregating the instances of communication error within a cluster of grid bins of the set of grid bins determined to be near a target grid bin; and
assigning an aggregated number of the instances to the target grid bin.

12. The system of claim 11, wherein the aggregating includes selecting a size of the cluster of grid bins determined to achieve a statistically significant number of the instances of communication error for the target grid bin.

13. The system of claim 11, wherein the cluster of the grid bins is an irregular shape near the target grid bin reflecting a non-uniform mobile terminal density population in a target geographic area of the target grid bin.

14. A method, comprising:
processing data, by a system including a processor, related to radio interface failures pertaining to a mobile network within subsets of a geographic area associated with the mobile network;
identifying, by the system, an increase in contemporaneous radio interface failures of the radio interface failures relative to historic data within the subsets of the geographic area;
determining, by the system, at least one of the subsets of the geographic area most pertinent to the increase in contemporaneous radio interface failures;
retrieving, by referencing a base station error ticketing system, base station error ticketing data indicative of whether a network infrastructure failure pertinent to the at least one of the subsets of the geographic area has been identified by the base station error ticketing system;
issuing, by the system, a repair ticket notification for the at least one of the subsets of the geographic area in response to identification of a deviation in the contemporaneous radio interface failures and the historic data for the subset of the geographic area, and in response to the base station repair ticketing system having identified the network infrastructure failure pertinent to the at least one of the subsets of the geographic area; and
canceling or delaying, by the system, of the issuing the repair ticket notification at least in part in response to the base station repair ticketing system not having identified the network infrastructure failure pertinent to the at least one of the subsets of the geographic area.

15. The method of claim 14, further comprising receiving and storing the instances of communication error and geographic positions of the instances multiple times.

16. The system of claim 15, further comprising storing the instances of communication error and the geographic positions for respective predefined periods corresponding to the instances, and characterizing stored data as a function of hour and day received.

17. The system of claim 15, further comprising comparing contemporaneous instances of communication error of the instances with historic data in time periods and geographic areas defined as similar to instance time periods and instance geographic areas in which the contemporaneous instances of communication error are observed, to facilitate identifying the deviation condition.

18. A tangible computer readable device comprising computer-executable instructions that, in response to execution, cause a system including a processor to perform operations, comprising:
processing data related to radio interface failures and geographic locations of the radio interface failures pertaining to a mobile network;
identifying an increase in contemporaneous radio interface failures of the radio interface failures relative to historic data within discrete subsets of a geographic area served by network devices of the mobile network;
determining at least one of the discrete subsets of the geographic area most pertinent to the increase in contemporaneous radio interface failures;
referencing a base station repair ticketing system to retrieve base station error ticketing data indicative of whether a network infrastructure failure pertinent to the at least one of the discrete subsets of the geographic area has been identified by the base station repair ticketing system;
issuing a repair notification for the at least one of the discrete subsets of the geographic area in response to identification of a deviation in the contemporaneous radio interface failures and the historic data for the at least one discrete subset of the geographic area, and in response to the base station repair ticketing system having identified the network infrastructure failure pertinent to the at least one of the discrete subsets of the geographic area; and
canceling or delaying the issuing of the repair notification for the subset of the subsets of the geographic area at least in part in response to the base station repair ticketing system not having identified the network infrastructure failure pertinent to the at least one of the discrete subsets of the geographic area.

19. The tangible computer readable device of claim 18, wherein the operations further comprise:

characterizing the geographic locations as a set of grid bins defined as subsets of a grid of discrete and contiguous two-dimensional shapes, wherein grid bins of the set of grid bins located within a region of the mobile network are mapped to respective geographic areas having sizes that are determined from population densities of mobile terminals within the region, and wherein different regions having differing population densities have differing grid bin sizes.

* * * * *